INVENTORS.
STEPHEN W. AMBERG.
WALTER E. AMBERG.
BY JIM C. CAHLIK.
ATTORNEYS.

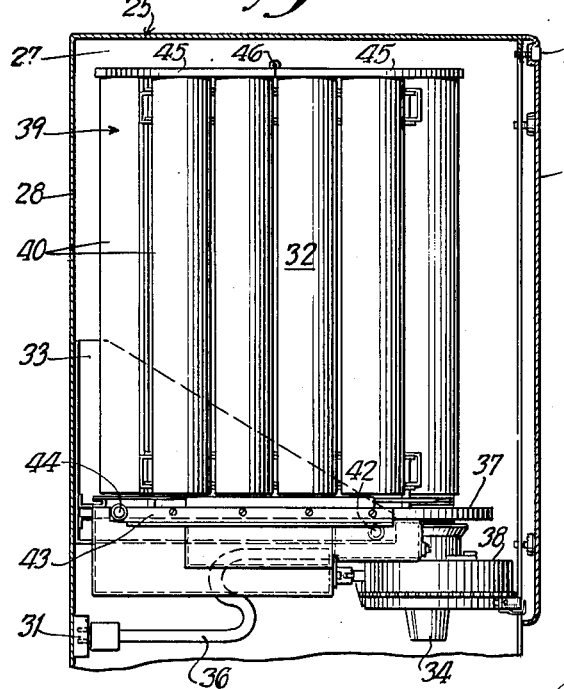
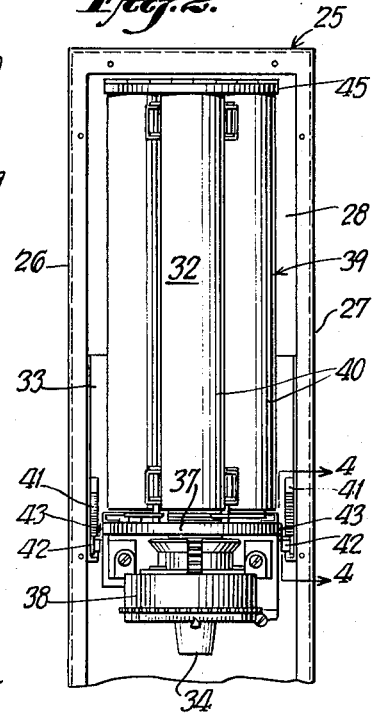
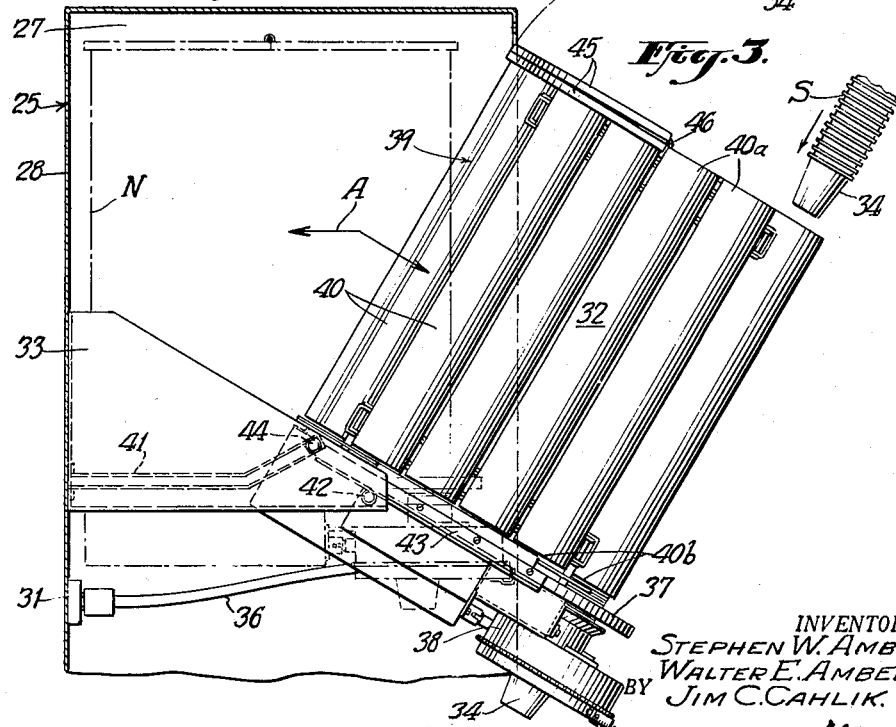

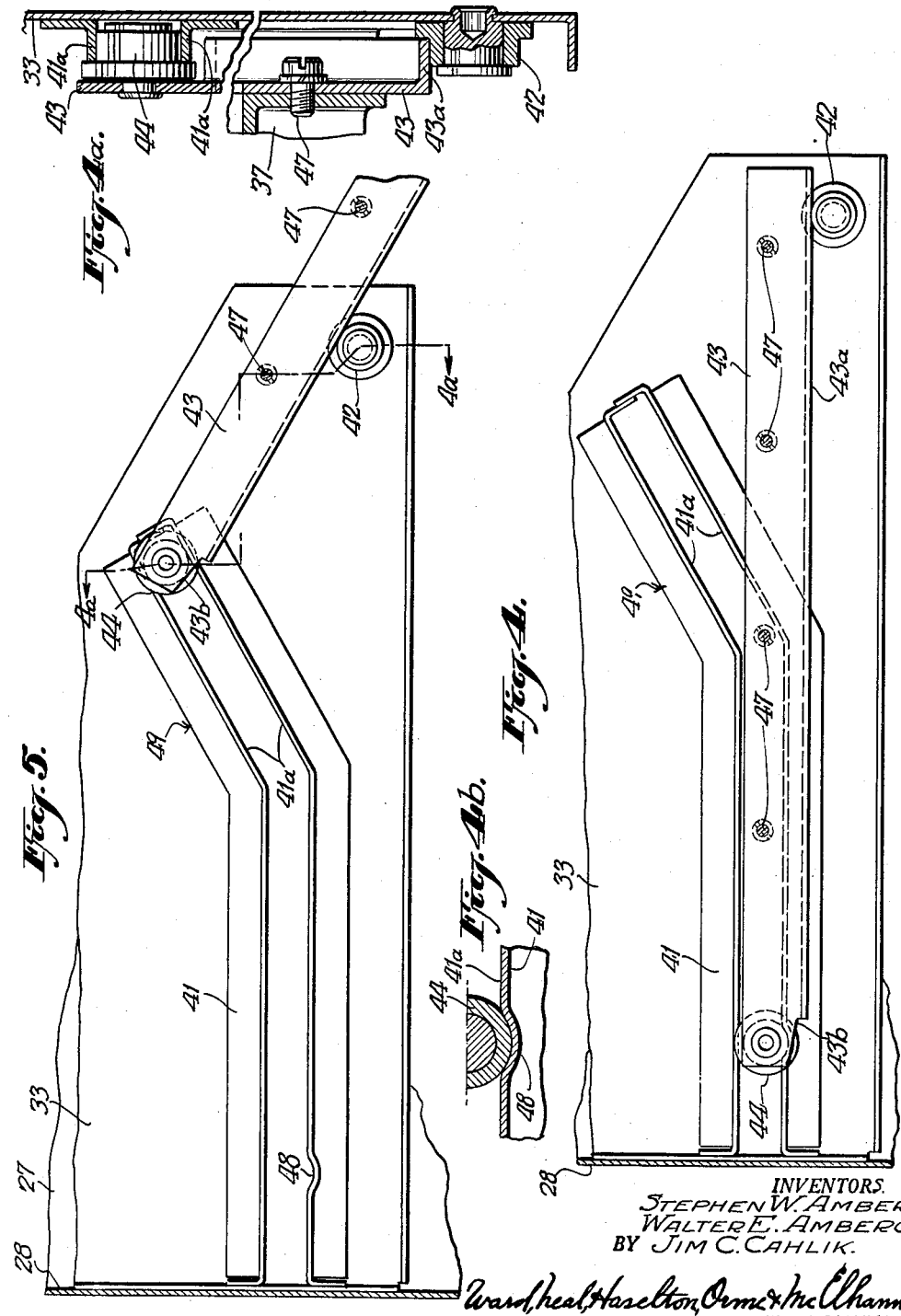

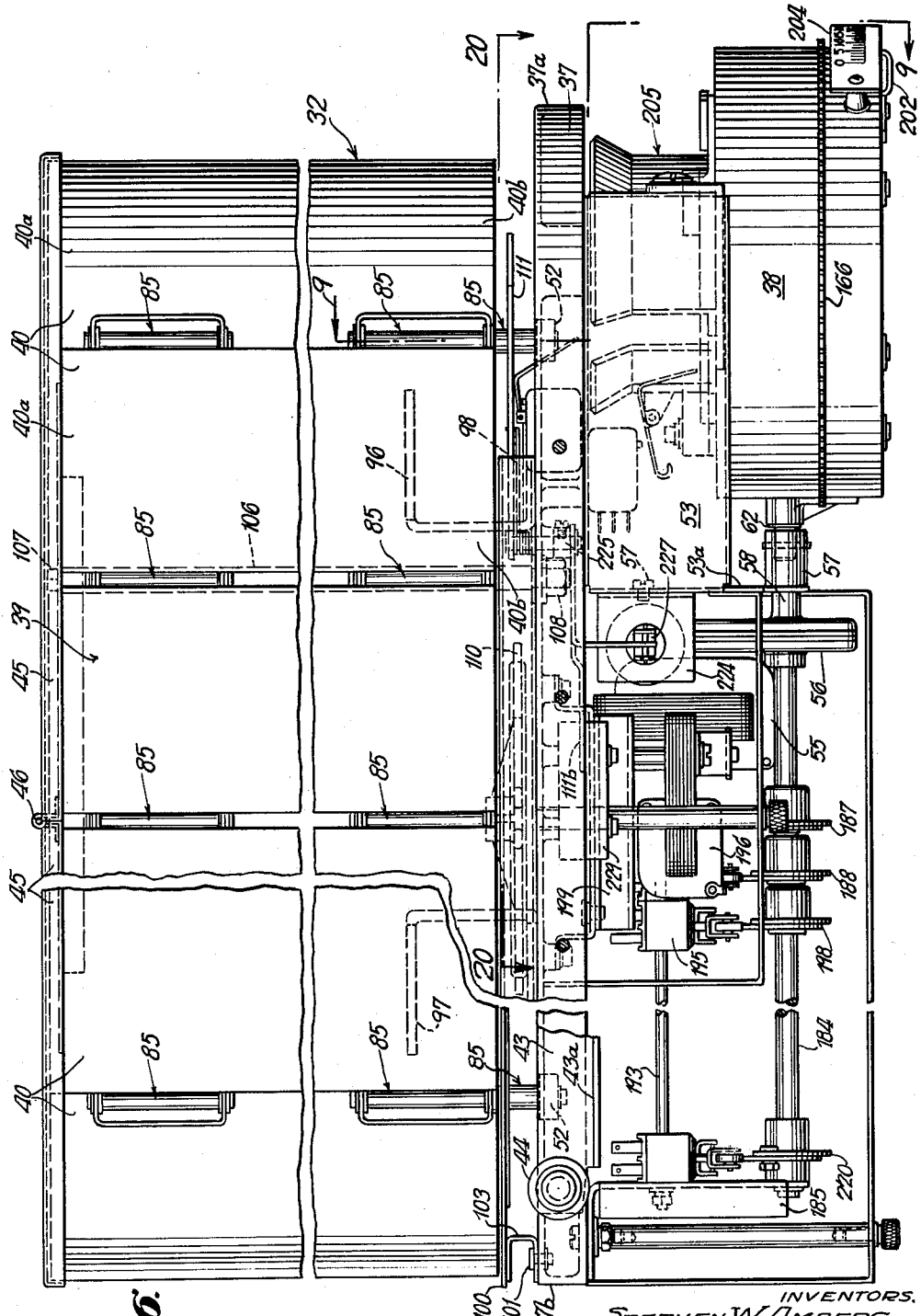

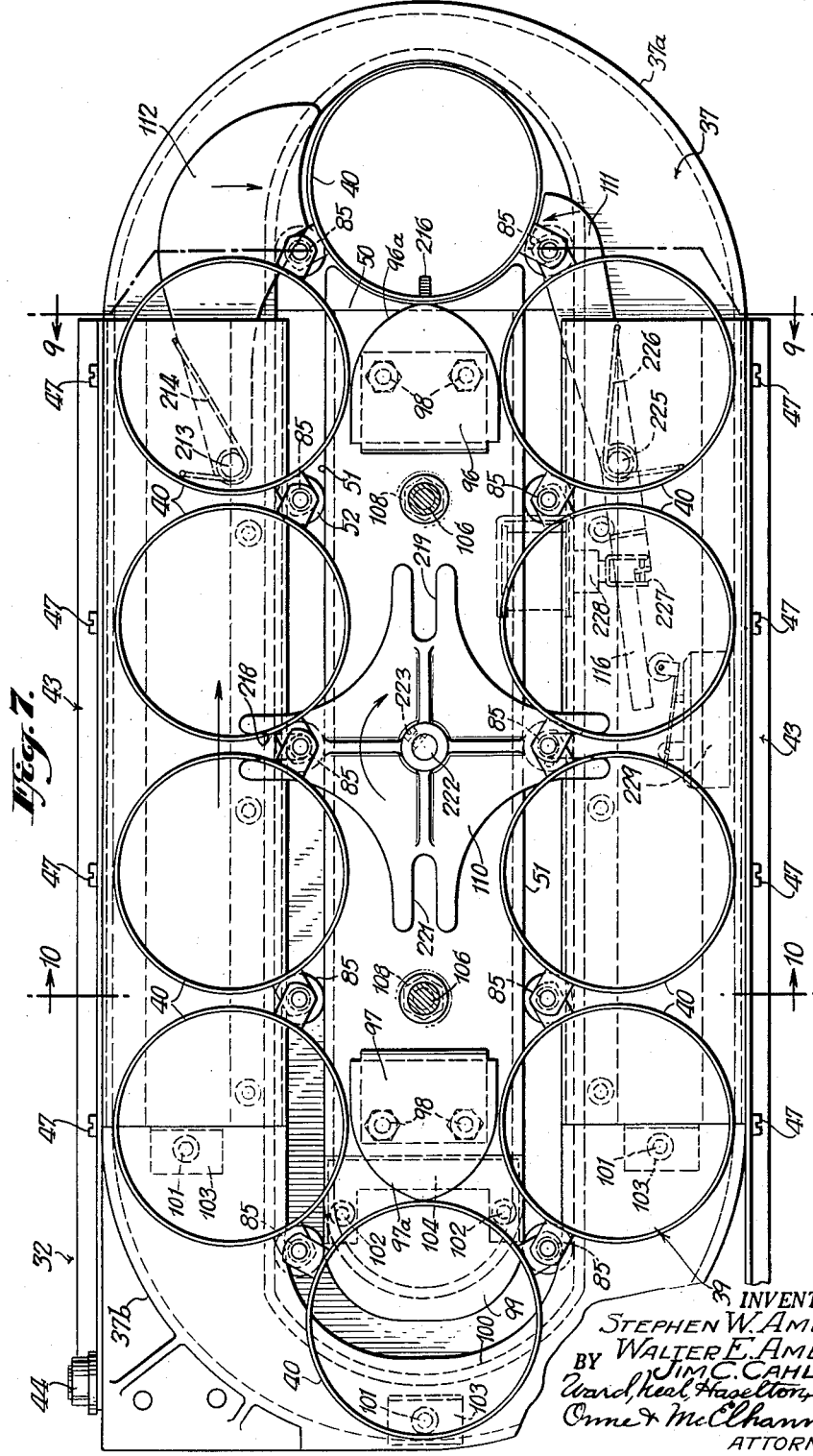

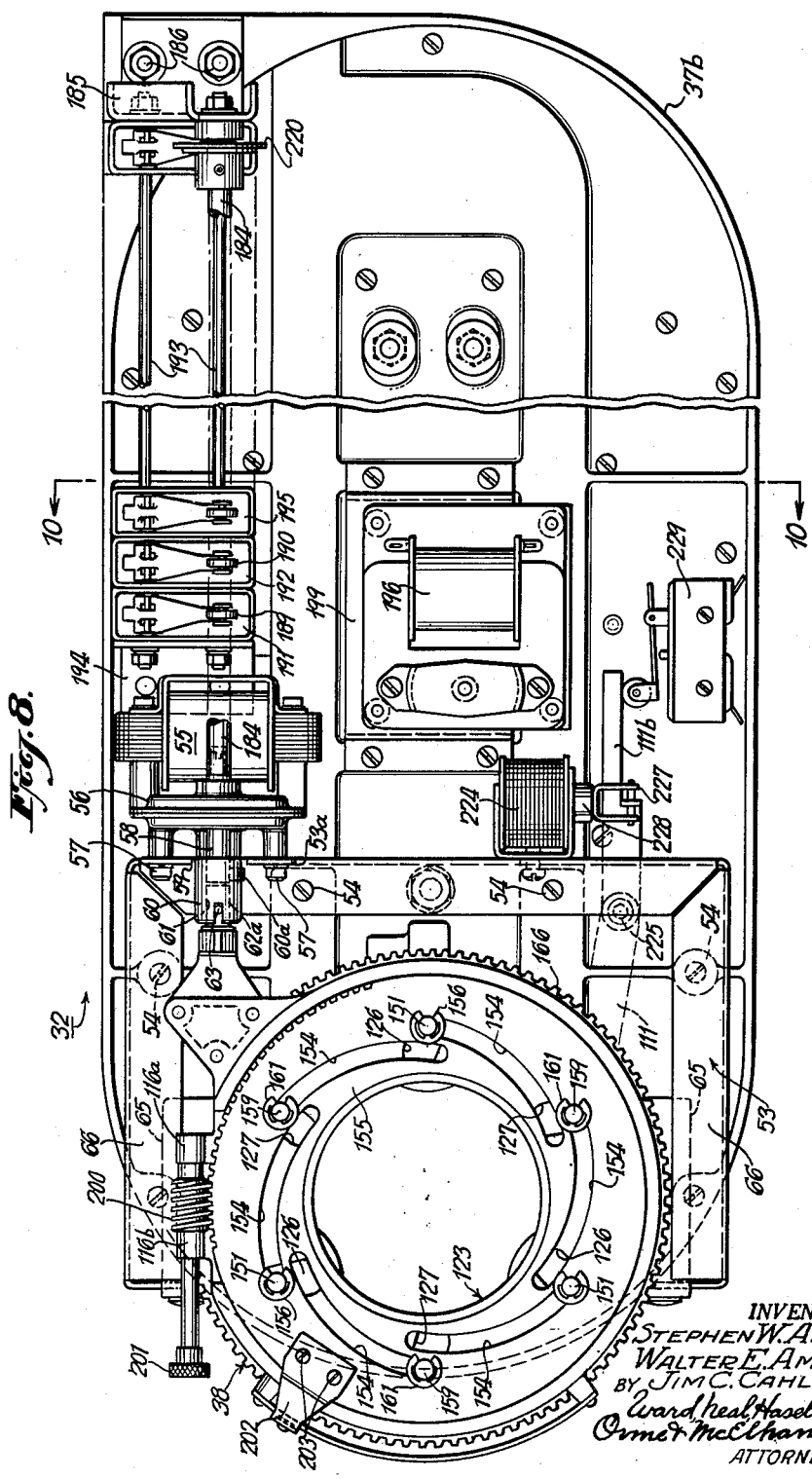

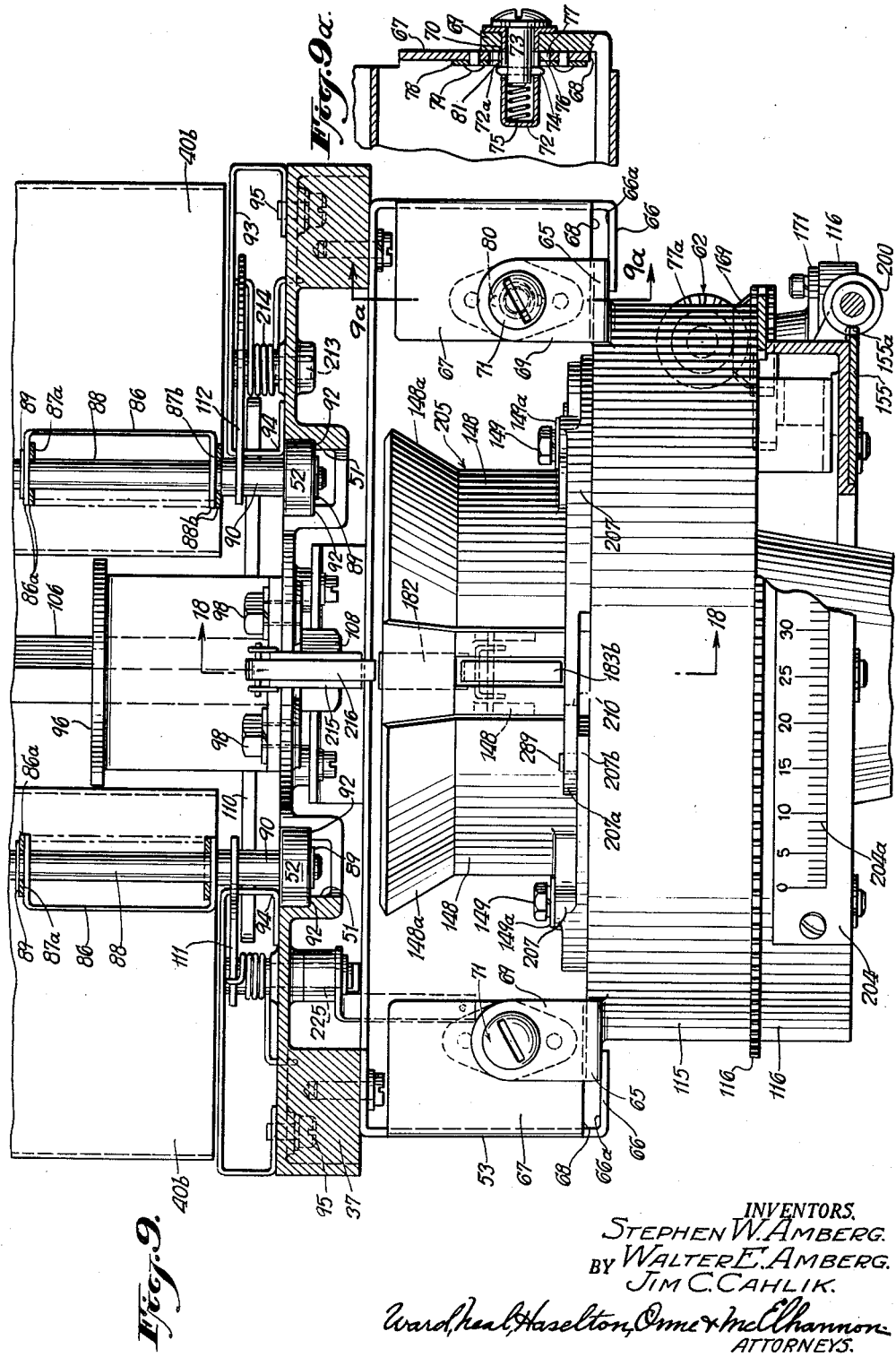

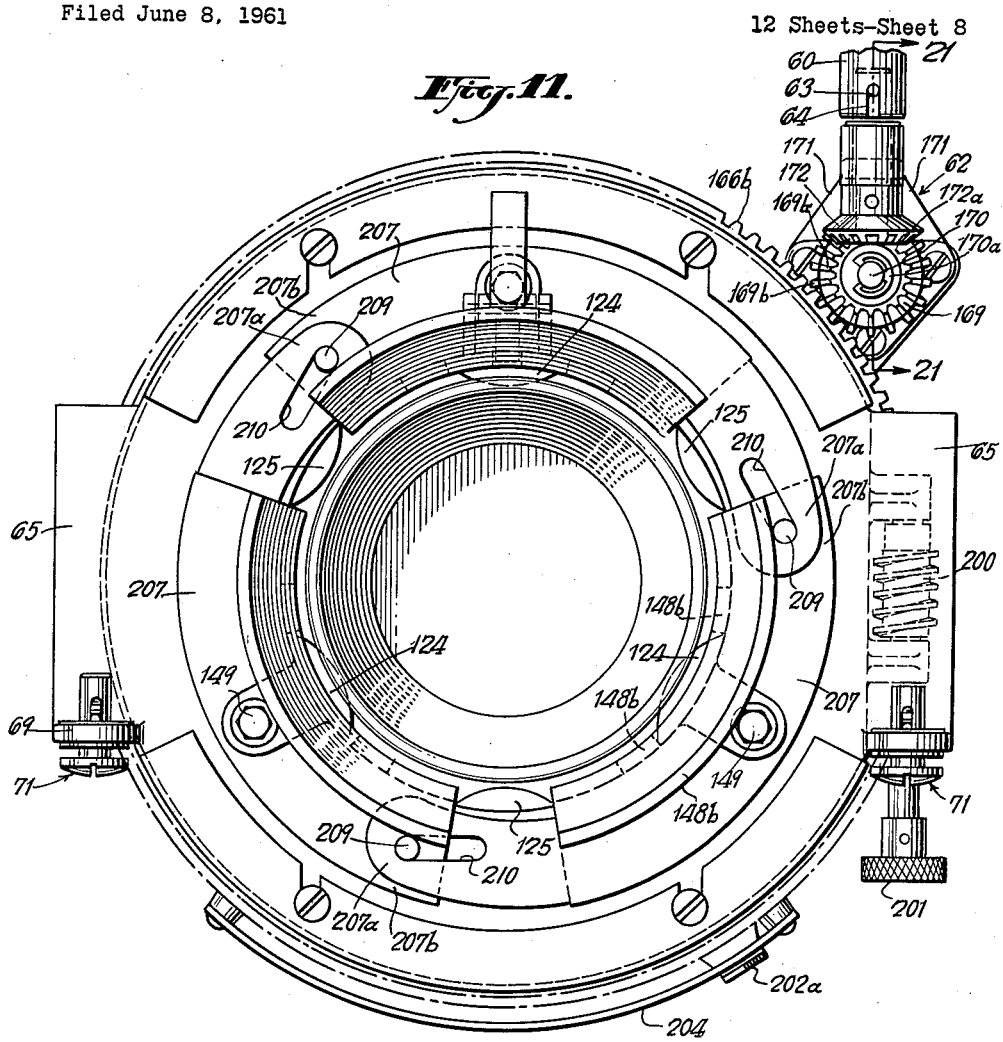
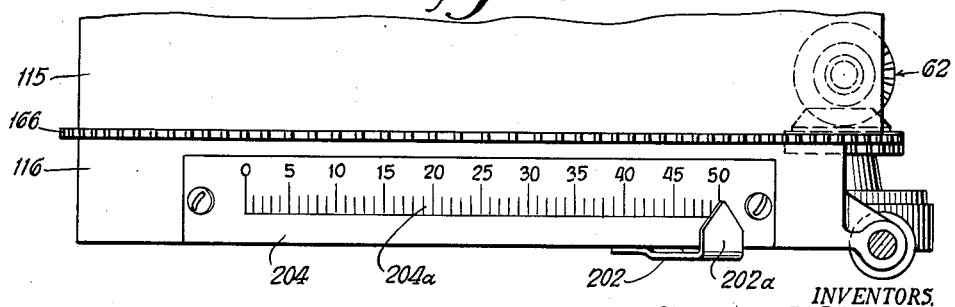

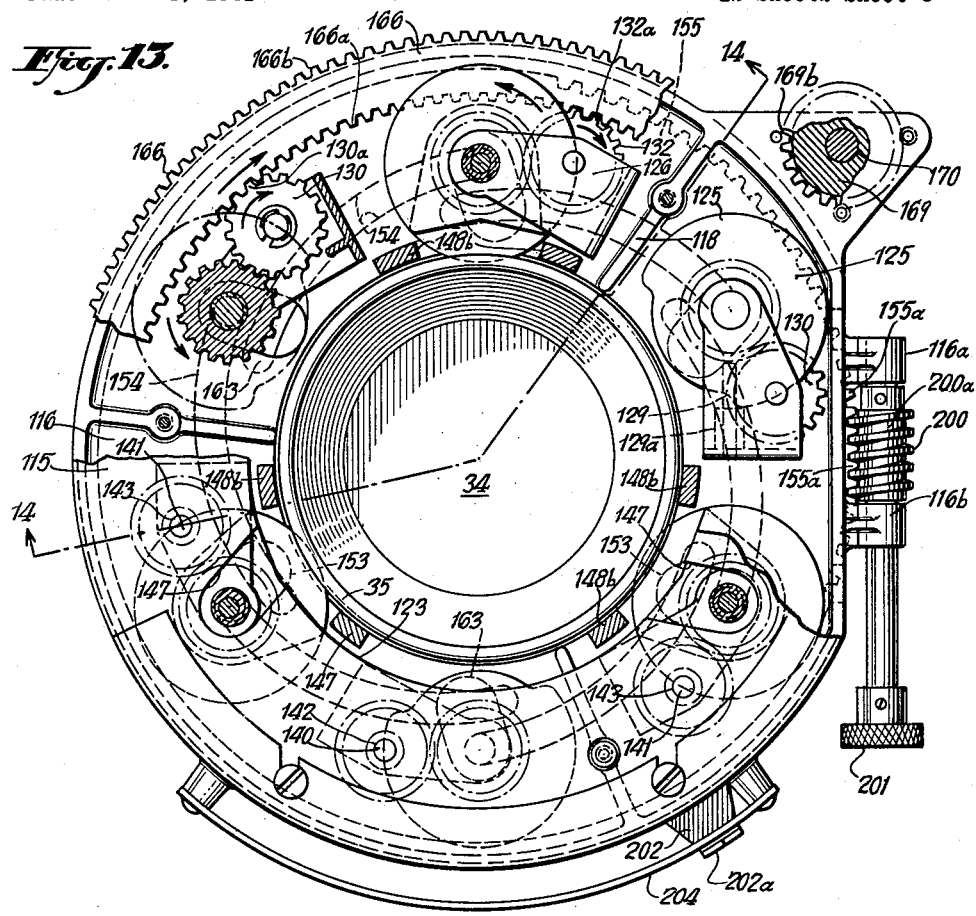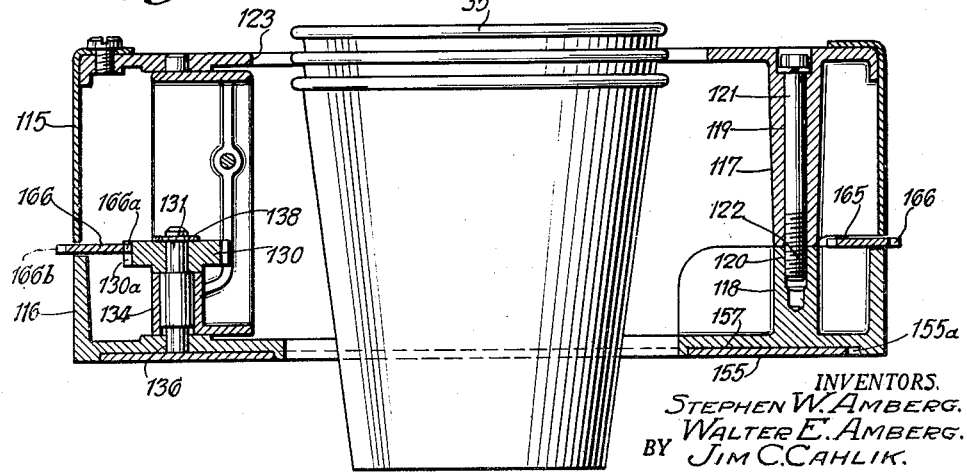

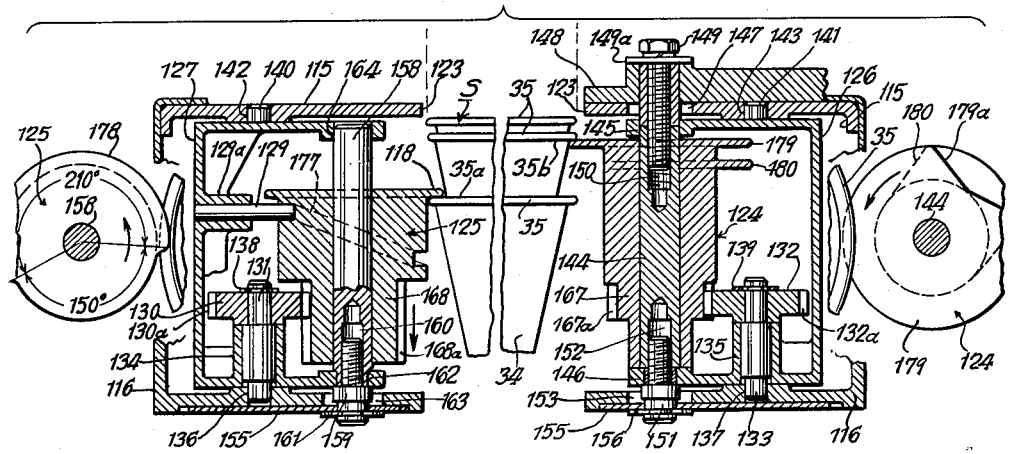
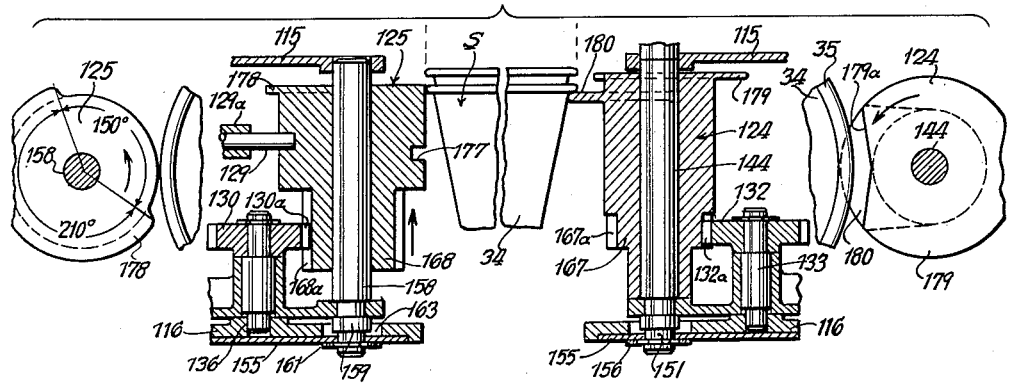
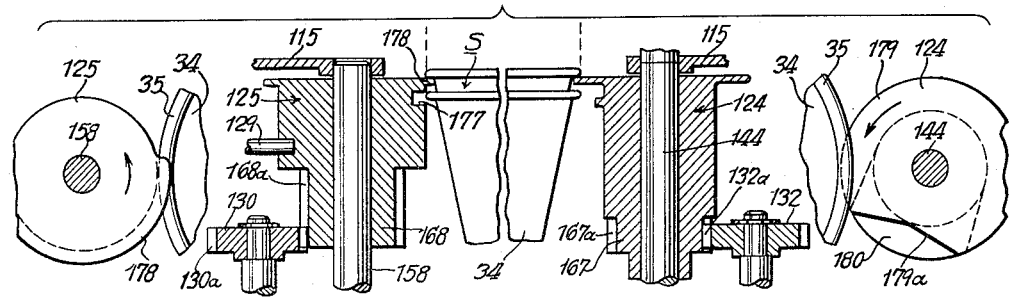

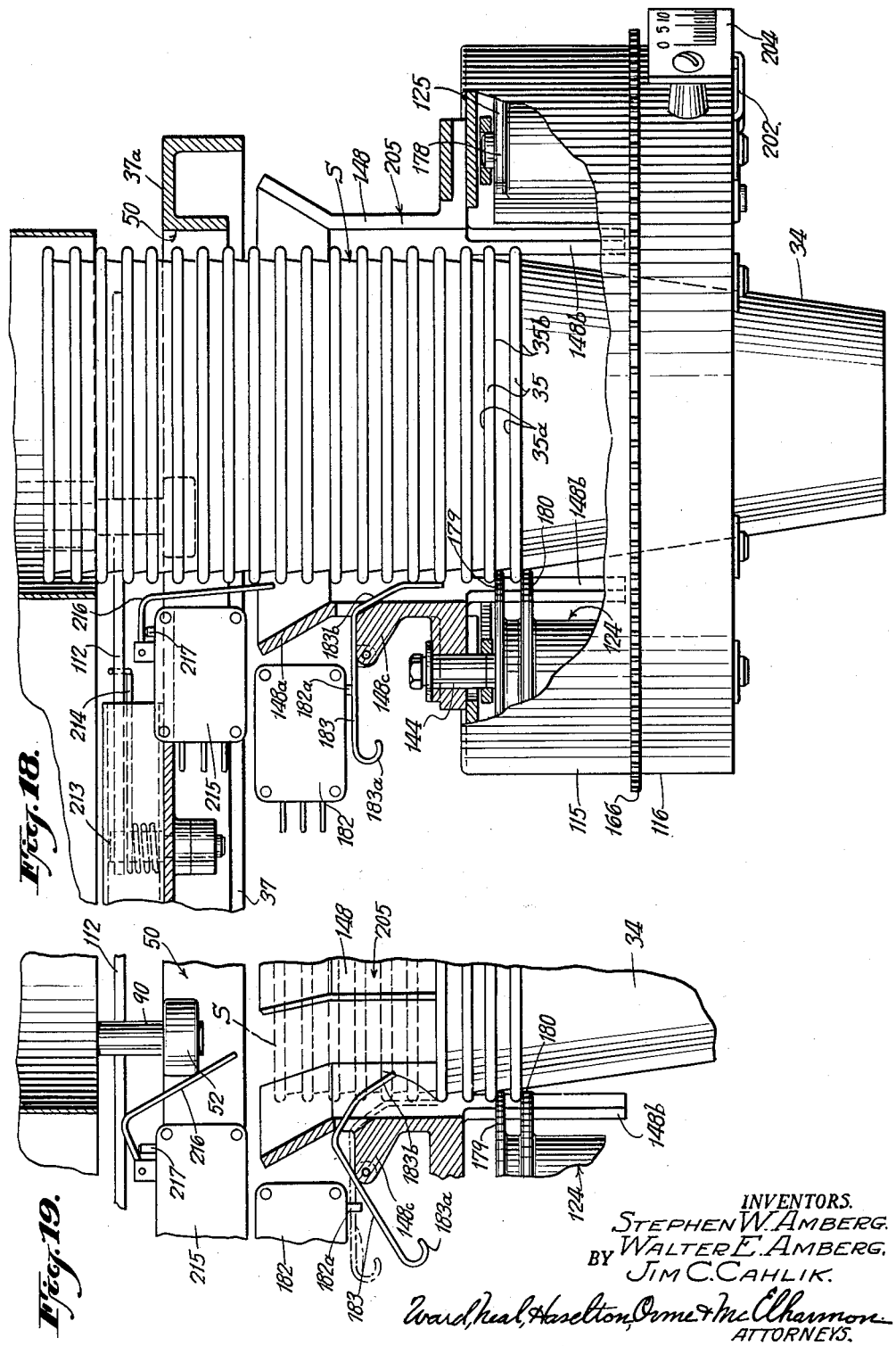

Feb. 4, 1964 S. W. AMBERG ETAL 3,120,324
APPARATUS FOR DISPENSING ARTICLES FROM A NESTED STACK
Filed June 8, 1961 12 Sheets-Sheet 12
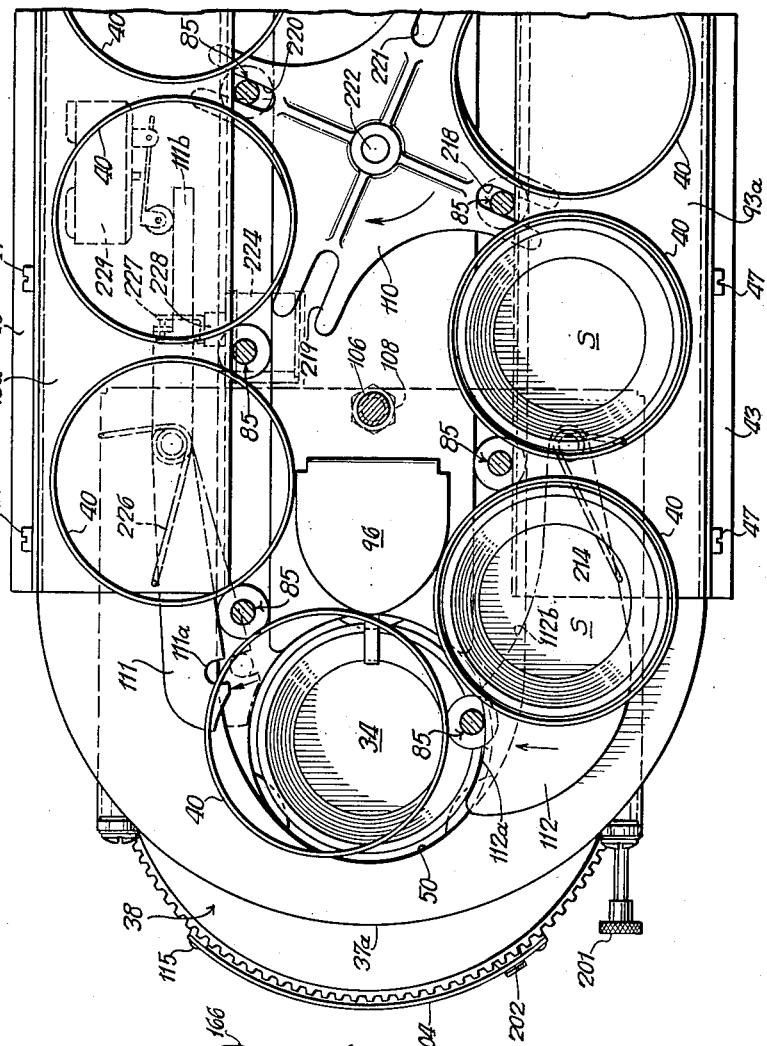
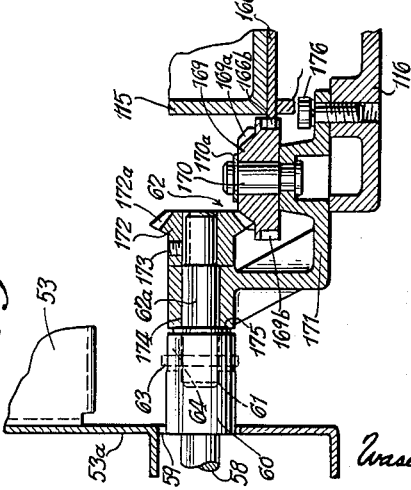
INVENTORS.
STEPHEN W. AMBERG.
WALTER E. AMBERG.
BY JIM C. CAHLIK.
ATTORNEYS.

United States Patent Office 3,120,324
Patented Feb. 4, 1964

3,120,324
APPARATUS FOR DISPENSING ARTICLES FROM A NESTED STACK
Stephan W. Amberg, Syosset, N.Y., Walter E. Amberg, Chicago, Ill., and Jim C. Cahlik, Cleveland, Ohio, assignors to Lily-Tulip Cup Corporation, New York, N.Y., a corporation of Delaware
Filed June 8, 1961, Ser. No. 116,242
27 Claims. (Cl. 221—4)

This invention relates to apparatus for temporarily storing stacks of nested articles, such as paper drinking cups or the like, and for dispensing the articles one at a time for use from one of such stacks, the stacks successively moving into dispensing position upon the preceding stack having been depleted. The invention is particularly useful for storing and dispensing cups in beverage vending machines and therefore will be described in connection with such use, although it will be understood that the invention may have other applications.

When used as the drinking cup dispenser in beverage vending machines, and because such vending machines operate unattended and, further, remain unattended for considerable periods of time, it is important that the apparatus of this type be compact, yet capable of convenient loading and storing of a relatively large quantity of cups, and further be highly dependable in operation to always dispense a cup, but only one cup at a time, upon actuation. Perhaps even more important is the capability of the apparatus to dispense the cup in a manner assuring its proper drop into upright position to accommodate the beverage which, in the timed cycle of vending machine operation, will automatically begin to pour into it. When by malfunction of the dispensing apparatus a cup is not dispensed at all, or not dispensed properly into position to be filled with beverage, or when a cup becomes jammed within the apparatus thereby preventing succeeding cups from being dispensed, or when the cup is delivered in torn or crushed condition, considerable customer dissatisfaction and considerable waste of the beverage product or loss of sales is inevitably the result. One or more of these deficiencies are believed to be inherent in any such dispensing apparatus heretofore known. Moreover, many of the prior devices do not provide adjustability of the size of the dispensing throat portion thereof to accommodate a wide variety of cup diameters, as is necessary to promote the use of a single dispensing apparatus as a standard dispenser from which different sizes of cups may be dispensed. This feature is desirable in view of the extensive range of sizes of cups in common or intended use, for serving different quantities of different beverages, for example.

Accordingly, it is intended by the present invention to provide a more effective dispensing apparatus than has heretofore been obtainable for the aforementioned, or similar purpose.

Briefly and generally describing a preferred form of the invention, a magazine of about five to a dozen hollow tubular cup holders, each vertically arranged for holding a stack of about fifty to one hundred nested drinking cups, is mounted on a base or support which includes track elements for guiding the endless series of cup holders, which are linked together, within a compact, generally rectangular pattern of movement to index each of them sequentially into vertical juxtaposition with a turret type cup dispensing head, the latter being mounted in suspended fashion beneath the base at the front, or one of the narrow ends thereof, and providing a dispensing throat portion of the apparatus through which the cups will be singularly dispensed. Rotative indexing movement of the magazine to bring each tubular cup holder sequentially into cup dispensing position as the supply of cups in the preceding cup holder becomes depleted is determined and controlled by a microswitch arrangement which automatically starts a magazine indexing motor in response to the desired extent of depletion having been attained of the stack of cups then being dispensed. Both the construction and arrangement of the magazine, including the linkage means between the cup holders which also engage the track elements and the star type magazine drive wheel which engages the linkages, are greatly simplified, yet are very effective as compared to that construction and arrangement in apparatus heretofore known.

The construction further includes a cup gate device mounted on the base above the cup dispensing head and operable in coordinated relation to cup holder movement during each magazine indexing cycle in a manner cooperable with guide means on the dispensing head to insure an accurate, vertical drop of the stack of cups into the dispensing head from within the tubular cup holder then being indexed into cup dispensing position. Such assured vertical drop of the cups into the dispensing throat is an important feature in apparatus of the sort, contributing to dependable cup dispensing by reducing the likelihood of cups jamming within the apparatus.

The referred to base of the apparatus is roller mounted on fixed guide means which are attached, for example, within a beverage vending machine so that the entire cup dispensing apparatus, as a unit, may be rolled forward and out of the confines of the vending machine for the cup loading operation which is performed by dropping stacks of nested cups into each of the tubular cup holders from the open top ends thereof. All of the cup holders are simultaneously accessible for the purpose without the necessity of indexing movement of the magazine to bring each cup holder sequentially into a cup loading position, as is required by some prior known devices of the type. Moreover, the fixed guide means for the roller mounted base incorporates tracks having an inclined ramp portion, in the direction in which the unit will be rolled out of the vending machine for loading and an associated fixed roller which is also attached to the vending machine at an offset location with respect to the center of gravity of the unit when rolled out for loading, to provide a tilt feature in the mounting arrangement for bringing the top ends of the cup holders, normally located quite high due to their lengths, down to a convenient height for insertion of the stacks of cups. When all of the cup holders have been filled with cups, the entire apparatus is simply rolled back into the vending machine, whereupon the front panel of the vending machine is closed and the machine is again ready for use.

The cup dispensing head, which serves as the dispensing throat portion of the apparatus and provides the means by which the cups are dispensed one at a time, incorporates certain novel features and arrangements of the parts thereof which assure dependability in its operation. Three fully rotatable and disc-like cup support elements, each constructed having flat, projecting flange portions as will be described, are mounted in equally spaced relation about the periphery of the cup passage provided by the dispensing head, the flange portions appropriate to sequentially engage the undersurfaces of the flanged or beaded rims of the lowermost and next to the lowermost cups in the stack to support the stack in three-point suspension at the different stages of the cup dispensing cycle of operation, and to index the lowermost cup into a position to be dispensed. Mounted in the same manner about the cup passage periphery, but interposed respectively between the cup support elements, are three fully rotatable and vertically reciprocal cup stripper elements, each having a single, flat, projecting flange portion which, at a proper time during the dispensing cycle, engages the upper surface of the flanged rim of the cup which has been indexed into position to be dispensed, to strip the cup vertically downward and off from the bottom of the nested stack of cups when the apparatus is actuated. This "direct strip down" feature in the apparatus promotes the capability thereof to cause a cup to drop smoothly and accurately into its upright position in the vending machine to be filled with the vended beverage, and further insures against crushing or other distortion of the cups as they are dispensed, as sometimes occurs using any of the known cup dispensing apparatus which incorporates positive means, such as wedge-shaped cam surfaces on rotatable cams, for stripping a cup from the bottom of the nested stack.

All of the support elements and stripper elements are mounted in a geared drive arrangement which operates to rotate all of the same through a dispensing cycle in response to the operation of a motor which is energized for the period of time covering the cycle by the on-off switch apparatus. The on-off switch may, of course, be coin actuated as in the case of vending machines.

In addition, the mounting arrangement includes a concentrically mounted and pivotally adjustable iris plate portion of the frame of the dispensing head, which plate has a number of eccentrically disposed cam slots within which the shafts of the cup support and stripper elements are respectively mounted, as will be seen, so as to permit adjustment of the respective extents of radial projection of the same into the dispensing throat passage, thereby providing adjustability of the diameter of this passage to accommodate cups of a variety of sizes.

These and other objects and features of the invention will become more fully apparent from the following detailed description of a preferred embodiment thereof. It should be understood, however, that certain changes, or other modified forms of the invention might be made by those having skill in the art, upon an understanding of the principles of the invention having been gained, but that all such changes and modifications are within the true scope of the invention which is intended to be limited only by the appended claims.

In proceeding with the detailed description, reference will be made to the accompanying drawings in which:

FIGURE 1 is a side elevation, in fragmentary cross-section, of a vending machine having dispensing apparatus in accordance with the invention installed therein in position for article dispensing operation;

FIGURE 2 is a fragmentary front elevation of the vending machine of FIGURE 1 as it would appear having a front panel thereof removed;

FIGURE 3 is a view similar to FIGURE 1, but showing the dispensing apparatus moved to the article-loading position thereof;

Figure 10:
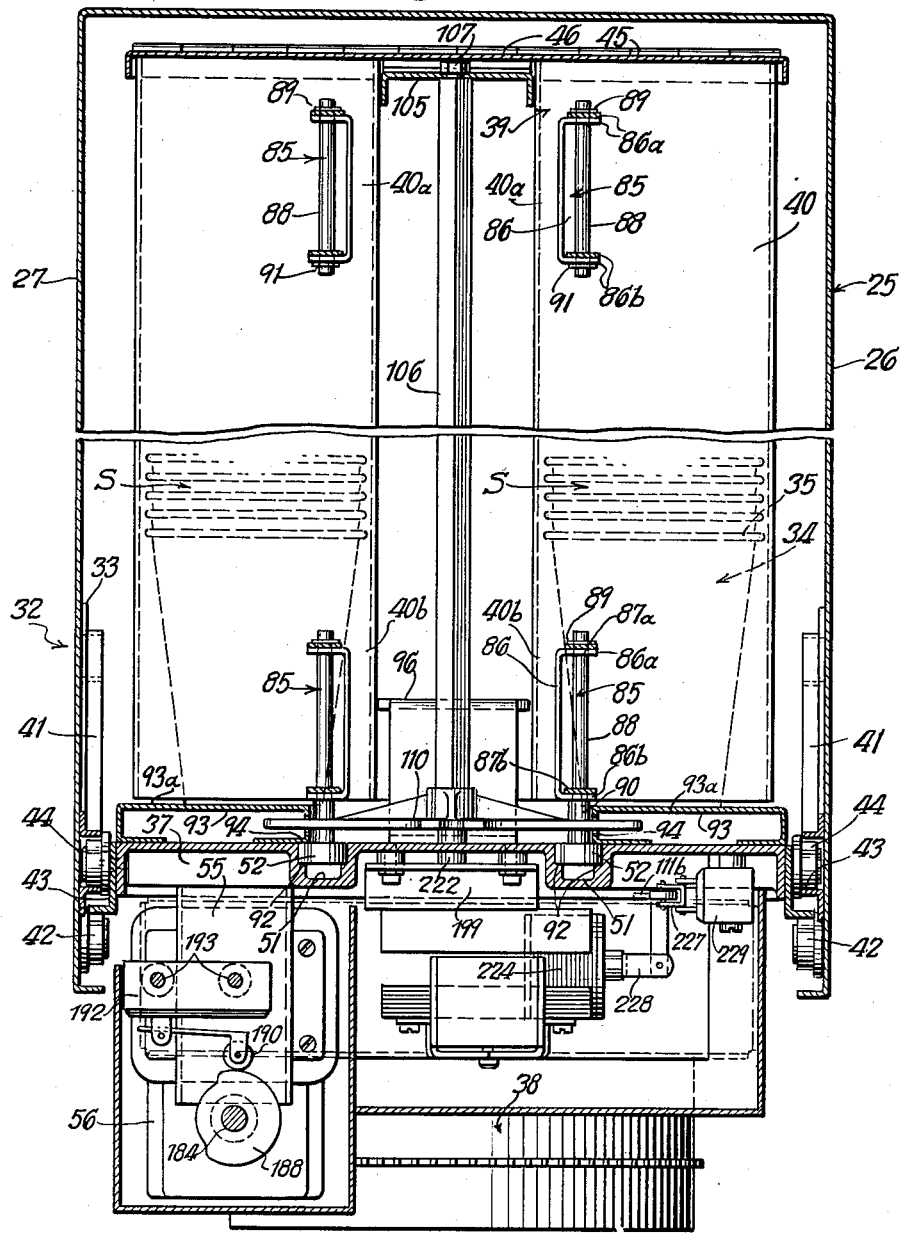

FIGURE 4 is an enlarged fragmentary side elevation, as viewed from line 4—4 of FIGURE 2, of one of the roller and guide tracks for mounting the dispensing apparatus within the vending machine in position as shown in FIGURE 1; FIGURE 4a is a still further enlarged fragmentary view showing one of the vending machine fixed guide rollers in cross-section taken at line 4a—4a of FIGURE 5; FIGURE 4b is a similarly enlarged fragmentary view of one of the dispensing apparatus rollers showing its engagement with the vending machine tracks as in FIGURE 4 to retain the dispensing apparatus in its position of FIGURE 1;

FIGURE 5 is an enlarged fragmentary side elevation of one of the roller and guide tracks as shown in FIGURE 4, but illustrating the operation thereof when the dispensing apparatus is moved to its position as shown in FIGURE 3;

FIGURE 6 is a side elevation of the dispensing apparatus of the invention with its vending machine mounting bracket removed;

FIGURE 7 is a top plan view of the dispensing apparatus with the covers and track element for the article holders at the top of the apparatus removed;

FIGURE 8 is a bottom plan view of the dispensing apparatus with the protective cover plates which cover certain operating parts removed;

FIGURE 9 is an enlarged fragmentary front end view of the dispensing apparatus partially in cross-section taken at lines 9—9 of FIGURES 6 and 7; FIGURE 9a is a sectional side elevation, taken at line 9a—9a of FIGURE 9, to show in greater detail the attachment means for the article dispensing head of the apparatus;

FIGURE 10 is an end elevation of the dispensing apparatus shown in cross-section taken at lines 10—10 of FIGURES 6–8;

FIGURE 11 is an enlarged top plan view of the article dispensing head of the apparatus;

FIGURE 12 is a fragmentary front end elevation of the article dispensing head;

FIGURE 13 is a top plan view of the article dispensing head somewhat similar to that of FIGURE 11, but the upper half of the drawing showing the upper housing member removed therefrom, and the lower half of the drawing showing the upper housing member in place with only the article guides, which are mounted on the upper housing member, removed therefrom;

FIGURE 14 is a vertical cross-sectional view of the article dispensing head taken at line 14—14 of FIGURE 13;

FIGURES 15, 16 and 17 are diagrammatical representations showing in sequence the movement of the article dispensing head during an article dispensing cycle of operation thereof;

FIGURE 18 is an enlarged fragmentary side elevation of the dispensing apparatus of the invention, partially in cross-section as generally viewed from line 18—18 of FIGURE 9, to show certain details of its operation;

FIGURE 19 is a view similar to FIGURE 18 showing further details of the operation of the dispensing apparatus;

FIGURE 20 is a top plan view similar to FIGURE 7, but showing a front end fragment (as indicated by line 20—20 of FIGURE 6) of the dispensing apparatus to illustrate further details of its operation; and FIGURE 21 is a vertical cross-section, taken at line 21—21 of FIGURE 11, of the drive gear portion of the article dispensing head, but additionally showing engagement therewith of the dispensing head drive shaft of the apparatus.

The general arrangement of a dispensing apparatus made in accordance with the invention is perhaps best initially understood by reference to FIGURES 1–3 wherein the apparatus is shown in mounted condition within a vending machine to dispense articles one at a time, such as paper drinking cups, upon actuation of the machine. The vending machine may be considered generally of the type found in public places for dispensing soft drinks and the like in individual portions for consumption in the vicinity of the machine.

Referring to these figures of the drawings, the vending machine cabinet is represented generally by the reference numeral 25 and may be considered as having side panels 26 and 27, a rear panel 28, and an openable front cover panel 29, the latter being removably attached at the front of the machine, from whence the beverage will be taken by the customer, by the panel attachment means 30. The vending machine is electrically operated, having an electrical outlet 31.

For individually dispensing drinking cups 34 in which the beverage will be contained, it is seen from FIGURE 1 that the dispensing apparatus 32 is mounted within the vending machine cabinet 25, on an interior frame portion 33 of the latter which, in a preferred form, is generally U-shaped and attached so as to extend around the interior of the cabinet adjacent the side panels 26, 27, and the back panel 28. Of course, the frame portion 33 could consist of only the side panels 26, 27 themselves.

In a usual operation of the vending machine, the dispensing apparatus 32 dispenses individual paper cups 34, dropping them into a beverage filling position (not shown) below and somewhat behind the front panel 29 to be filled by the vended beverage which, in the time sequence of the operation of the machine, flows into the cup by conventional beverage dispensing means from a reservoir therefor (not shown). The general operation is considered sufficiently familiar to the reader so as not to require further explanation.

As will be observed throughout the drawings, each of the dispensed articles such as drinking cups 34 is of a conventional type having a flange 35, perhaps more often referred to as a beaded rim. The cups are dispensed one at a time from nested stacks S thereof, each stack usually containing from 50 to 100 of the cups 34. For connecting the dispensing apparatus to an electrical power source, a flexible power cable 36 of the apparatus electrically engages the socket outlet 31 of the vending machine cabinet 25.

Dispensing apparatus 32 generally comprises a base or support 37 on the front end of which a dispensing head 38 for individually dispensing cups 34 is mounted in suspended fashion. Also mounted on the support 37, for storing a number of stacks of cups S, is a cup holder magazine generally indicated by reference numeral 39 which comprises a plurality of from about five to a dozen tubular cup holders 40 which are vertically arranged, each to contain a stack of cups S. Individual cups 34 will be dispensed one at a time from the stack thereof which is within only one of the tubular cup holders 40, such being that cup holder 40 which is adjacent the front end of the vending machine and in cup dispensing or vertically aligned position with respect to the cup dispensing head 38, as seen in FIGURE 1. When the supply of cups from this cup holder has been depleted, the dispensing apparatus 32 will automatically index another cup holder 40 into the cup dispensing position to permit continuity of operation of the apparatus in dispensing all of the cups 34 one at a time from all of the stacks S thereof which are within the several cup holders 40.

Referring now to FIGURES 2 and 3, when it becomes necessary to reload the cup holder magazine 39 with stacks of cups S, the front cover panel 29 of the vending machine cabinet 25 is removed by manipulation of the cover panel attachment means 30, thereby exposing the front end of dispensing apparatus 32. The dispensing apparatus 32 is mounted on the interior frame portion 33 of the vending machine by means of tracks 41 and fixed guide rollers 42 which are attached to the frame portion 33 adjacent the respective sides 26, 27 of the cabinet 25, as shown. Attached along each side of the base or support 37 of the dispensing apparatus 32 is a mounting bracket 43 and a roller 44 which engage the fixed guide rollers 42 and the tracks 41, respectively, of the vending machine in a manner as will be hereinafter more fully described. For present purposes it is sufficient to say that the arrangement is such that the dispensing apparatus 32 may be rolled out of the vending machine cabinet 25 from its normal position N (indicated by dotted lines in FIGURE 3), in the direction of the indicating arrows A, first a distance forward and partially out of the front of the cabinet 25, and thence an additional distance in a downwardly tilted direction to the cup loading position thereof shown by FIGURE 3.

Each of the tubular cup holders 40 is open at its top end 40a (as well as its bottom end 40b) and the cup holder magazine 39 has a pair of magazine covers 45, each of which is attached by hinge means 46 in a stationary, but hingedly rotatable position with respect to the apparatus (as will be more fully apparent by reference to FIGURE 10). When the dispensing apparatus 32 has been moved to its cup loading position as shown in FIGURE 3, one of the magazine covers 45 is swung about the hinge means 46 to expose the open top ends 40a of the several cup holders 40 in one-half of the magazine, whereupon each is loaded with a single stack of nested cups S by simply dropping the cups, in nested condition as indicated, into the cup holder. When one-half of the magazine has thus been loaded, both of the covers 45 are swung about the hinge means 46 to expose the open top ends 40a of the cup holders 40 in the other half of the magazine to be similarly loaded with stacks of cups S. The appropriate magazine cover 45 is then swung into its position closing the open top ends 40a of the last mentioned cup holders and the loading has been completed. The dispensing apparatus 32 is then rolled back into the vending machine cabinet 25 from its downwardly tilted loading position as shown in FIGURE 3 to its normal position N and the front cover panel 29 is replaced, whereupon the vending machine has been returned to its condition of FIGURE 1 for resumption of normal beverage and cup dispensing operation. It will be noted that the power cable 36 flexes appropriately so that it is unnecessary to sever or break in any way the electrical connection which powers the apparatus when a cup loading operation is to be performed.

Referring now to FIGURES 4 and 5 which illustrate in detail the means by which the dispensing apparatus 32 is mounted within the vending machine cabinet 25, a dispensing apparatus mounting bracket 43 is attached to the support 37 (see FIGURE 4a) by means such as screws 47 which, in view of the drawing section taken, are shown in cross-section. A bracket 43 is attached along each side of the support 37, only one of which is shown. As may be seen in FIGURE 4a, each mounting bracket 43 is made of angle iron, the lower leg of which projects outwardly from the support 37 and towards the cabinet side panel to which it is adjacent. Thus, the projecting lower leg provides a track which engages the respective fixed guide rollers 42 at each side of the cabinet interior frame portion 33. It should be noted that the lower leg of the angle iron mounting bracket 43 at the normally rearward disposed end thereof, is cut off, as at 43b (FIGURE 5), to clear the lowermost outwardly projecting track surface 41a when the dispensing apparatus is moved to cup loading position. At the same end of each mounting bracket 43 a roller 44 is attached adjacent the cutout portion 43b.

The rollers 44 of the dispensing apparatus mounting bracket 43 engage the respective tracks 41 at each side of the apparatus, the tracks 41 being attached by means (not shown) to the respective interior sides of the frame portion 33. As will be observed by comparison of FIGURES 4 and 4a, each track 41 comprises a pair of angle irons bent as shown and disposed having their lower legs facing each other to provide oppositely disposed and parallel roller guide surfaces 41a. As seen in FIGURE 4a, the lower leg portions project toward the interior of the cabinet 25. Thus, an interiorly projecting guide track is provided for follower engagement by the roller 44 at each side of the dispensing apparatus 32.

To provide two points of support along each dispensing apparatus mounting bracket 43 (one of which is provided by roller 44), a fixed guide roller 42 is appropriately attached at each side of interior frame portion 33 in position to be engaged by mounting bracket track surface 43a, the latter being provided by the lower leg of the angle iron mounting bracket 43. Thus, the dispensing apparatus 32 is mounted in two-point roller suspension at each side of the vending machine cabinet 25.

In order to hold the dispensing apparatus 32 in its normal position as shown in FIGURES 1 and 4, there is provided a track surface detent 48 at an appropriate location along the length of the lower track member of each track 41, which detents are engaged by the respective rollers 44 of the dispensing apparatus mounting bracket when the apparatus is in its normal position. The engagement between roller 44 and track detent 48 will be more clearly understood by reference to FIGURE 4b.

In order to provide the tilt feature in the arrangement which facilitates loading of the cup holders 40 with cups by bringing the open top ends thereof to within accessible reach, the tracks 41 have an upwardly turned portion, generally indicated by reference numeral 49, at a location along their lengths away from the track surface detent 48, starting at a distance slightly less than half of the distance between the points of dispensing apparatus support provided by rollers 42 and 44. The upwardly turned portion 49 faces towards the direction in which the dispensing apparatus 32 will be moved to its cup loading position as shown in FIGURE 3. It should also be noted that the respective ends of each track 41 which face the front of the vending machine are closed by folded lower leg portions of the track members, as shown, to prevent the rollers 44 from riding off the tracks 41 when the dispensing apparatus is in cup loading position.

The relationship between the length and the angle of incline of the upwardly turned track portions 49 and the position of fixed guide rollers 42 is such that after the dispensing apparatus 32 has been rolled out from the front of the vending machine cabinet 25 a distance approximately half its length, further movement of the apparatus causes the roller 44 to begin to ride up the incline 49, whereupon the center of gravity of the dispensing apparatus will have passed the common axial centerline of the rollers 42 to permit the dispensing apparatus to continue to move forward out of the machine and to tilt in response to gravitational forces. It is seen that the dispensing apparatus 32 may be thus eased into its cup loading position wherein it will rest without further attention to permit the cups to be loaded into the cup holders 40 as previously described. When the cup holders have been filled with cups, the dispensing apparatus 32 is pushed back into the vending machine cabinet, its rollers 44 at each side thereof being guided by the respective tracks 41, and its mounting brackets 43 being guided by the respective fixed guide rollers 42. As previously stated, when the dispensing apparatus 32 has returned to its normal position with its rollers 44 engaging the respective track surface detents 48, the front cover panel 29 of the vending machine is replaced and the vending machine is ready for resumption of normal operation.

Turning now to the details of construction of the dispensing apparatus 32, reference will first be made to FIGURES 6 through 10 of the drawings. It is seen that the base or support 37 of the apparatus is a generally rectangular-shaped metal casting having a rounded front end 37a and a similarly rounded rearward end 37b so that the overall outer edge shape generally conforms to a locus of points tangent to the cup holders 40 at their outermost surfaces. The support 37 has an opening for passage of cups 34 therethrough at the front end 37a thereof, the opening being generally indicated by reference numeral 50 (FIGURE 7). Formed as a groove in the top surface of the casting, and extending from the opening 50 in a generally rectangular pattern along an interior length of the casting as most clearly shown by FIGURE 9 is a guide track 51 for the cup holder link rollers 52 which move therein during indexing movement of the magazine, as will later be described.

As shown in FIGURES 6 and 9, the cup dispensing head 38 is removably mounted on a dispensing head support bracket 53 in suspended relation to the support 37, the bracket 53 being attached as by screws 54 (FIGURE 8) to the underside of the support 37 at the front end 37a thereof below the opening 50. Referring particularly to FIGURE 9, it is seen that the dispensing head 38 has outwardly projecting flange portions 65 at either side thereof which will seat on the respective inwardly projecting lower flange portions 66 of dispensing head support bracket 53 when the dispensing head is mounted thereon. The dispensing head support bracket 53 has inwardly turned vertical front flange portions 67 at either side thereof, the lower edges 68 of which are spaced upwardly from the lower flange portions 66 to provide passage for the dispensing head flanges 65. Referring now particularly to FIGURES 9 and 9a, the dispensing head 38 further has upwardly turned connection flanges 69 at either side thereof positioned to abut against the outer faces of the flanges 67 of the dispenser head mounting bracket 53. Each of the connection flanges 69 has a hole 70 therethrough in which is press-fit a quarter-turn connection screw, generally indicated by numeral 71, the cylindrical outer shell 72 thereof engaging the hole 70. A hole 76 corresponding to each of the holes 70 is formed in each flange portion 67 of the dispensing head support bracket 53. Slidable within the shell 72 of the connection screw 71 is a screw element 73 which has transversely projecting rod-like wings 74 at the end thereof which project through slots 72a on opposite sides of the shell 72. The screw element 73 is biased by spring 75, seated within the shell 72, in outward or unlocking position. Vertical slots 77 are formed at the top and bottom of each hole 76 of flange portion 67 for passage of wings 74. In addition, a wing engagement member 78 is attached, as by screws 79, to the rearward face of each flange 67 in surrounding relation to the holes 76. Each member 78 is apertured and slotted corresponding to hole 76 and slots 77 of the flange portion 67. These wing engagement members are each further adapted, as at 80, at locations along its central aperture ninety degrees removed from the vertical slots thereof, for seating and thereby locking engagement of the wings 74. Thus, when the dispensing head 38 is mounted on the dispensing head support bracket 53 by sliding of its flanges 65 along the top surfaces 66a of inwardly turned flange 66 of the support bracket, the shells 72 of the quarter-turn connection screws 71 will slide through the respective holes 76 in the support bracket flanges 67, and also through the central apertures of the engagement members 78, the wings 74 being oriented to pass through the vertical slots 77. When the upwardly turned flanges 69 of the dispensing head 38 are flush against the support bracket flanges 67, the screw elements 73 may then be depressed within the shells 72, against the bias of the respective springs 75, and rotated ninety degrees so that the wings 74 engage the locking adaptions 80, whereupon dispensing head 38 will be locked in its operating position on the support bracket 53. The dispensing head may be removed simply by rotating the screw elements 73 ninety degrees in the opposite direction, and then sliding the unit out of its seated position on bracket flanges 66.

It should be noted here that, upon mounting the dispensing head 38 in its operating position, the shaft 62a (FIGURES 8 and 9) of its miter gear 62 will operatively engage the dispensing head drive shaft 58 in the following slidable manner which provides removability of the engagement, without steps to disconnect the same, when the dispensing head unit is removed for repair or other purposes. Referring to FIGURES 6 and 8, it will be noted that the rearward facing end of bracket 53 is extended downwardly at one side thereof, as at 53a, to form a bracket portion for attachment to the apparatus of the dispensing head drive motor 55 and its integral and depending gear box 56, as by screws 57. The dispensing head drive shaft 58, which projects out of the gear box 56 towards the front end of the apparatus and through a recess aperture 59 formed in the dispensing head support bracket 53 for its passage, is thus positioned for driving engagement with miter gear shaft 62a of the dispensing head 38. The drive shaft 58 is provided with a dispensing head connection sleeve 60 which is attached as by a clamping screw 60a. The sleeve 60 is appropriately hollow, as at 61, to receive the miter gear shaft 62a. The miter gear shaft 62a has a transversely projecting pin 63 which will slidably engage a slot 64 at the end of the sleeve 60 upon mounting the dispensing head 38 in operating position on the dispensing head support bracket 53 as aforesaid.

The construction and arrangement of the cup holder magazine 39 on the support 37 will now be described, and for this purpose reference is particularly made to FIGURES 6, 7, 9 and 10.

In the embodiment shown, the cup holder magazine 39 comprises ten vertically arranged, hollow and open-ended tubular cup holders 40 which are linked together in an endless series thereof and mounted for movement on the the support 37 along the path of their linked periphery. It will be noted that the path of movement has a generally rectangular pattern as contrasted with the usual circular patterns of such movement in prior devices, and that the arrangement promotes compactness of the apparatus 32.

Rather than linking the magazine cup holders together by a drive chain or other means to which the cup holders are attached, as in prior cup dispensers, the means which link together the cup holders 40 comprise separate linkage means, generally indicated by numeral 85, disposed between each cup holder 40 and its adjacent cup holders at the top and bottom ends 40a, 40b thereof as shown, for example, in FIGURES 6 and 10. As will be later pointed out, the arrangement and construction of linkage means 85 is such as will also provide the means for engagement of the magazine with the magazine drive means. Thus, as will later be more fully understood, the construction of the cup holder magazine in the present invention eliminates many parts as well as certain malfunctions of the magazine drive apparatus, such as drive slack, etc., as are commonly found in previous chain drives or the like for the purpose.

In any endless magazine of this kind, the means whereby the cup holders 40 are linked together for annular rotative movement must provide for flexure between each of the cup holders, and for this purpose each of linkage means 85 includes hinges 86 attached in arcuately spaced relation at either side of each adjacent cup holder 40, as shown, and means for pivotally connecting the hinges together to form the endless chain. In the preferred form of the invention, each hinge 86 consists of a generally U-shaped bracket, vertically arranged and welded to the cup holder, having outwardly projecting upper and lower hinge portions 86a and 86b. The hinge portions 86a and 86b are each provided with holes 87a and 87b respectively therethrough, the holes 87a, 87b being in alignment for passage of the vertical link pin 88 which links together the hinges 86 of two adjacent cup holders. In linking two cup holders together, the upper and lower hinge portions 86a, 86b of one cup holder will engage the corresponding hinge portions 86a, 86b of the other cup holder in overlap relation as indicated on the drawings. A link pin 88 is passed through all four of the aligned holes 87a, 87b of the hinge portions, and a cotter pin 89 is passed around the link pin 88, above the uppermost of the hinges 86a, to prevent disengagement of the link pin at the upper end of the joined hinges. In the linkage means 85 at the top ends 40a of the cup holders, a second cotter pin 91 at the lower end of the link pin 88, under the lowermost of the hinges 86b, prevents disengagement of the link pin at the lower end of the joined hinges.

Below the lowermost of the hinge portions 87b at the bottom ends 40b of any two linked cup holders, the link pin 88 has a freely rotatable sleeve 90 mounted thereon, the sleeve having length to extend a suitable distance downward for a purpose as will later be described. Also mounted for rotatable movement on the link pin 88, below the sleeve 90, is the link roller 52 which engages the grooved guide track 51 in the support 37, as previously mentioned. Of course, a cotter pin (FIGURE 9) through or around the bottom of the link pin 88 retains the sleeve 90 and link roller 52 in mounted position. It should also be noted that the diameter of sleeve 90 is larger than that of the holes 87b so that the upper end of the sleeve 90 will engage the bottom surface of the lowermost hinge portion 86b for the purpose of cooperating with the cotter pin 89 at the top of pin 88 to retain the engagement of the link pin 88.

The cup holder magazine 39 is assembled on the support 37 in vertically mounted relation with respect to track elements of the support as will now be described. The track elements comprise the guide track 51 formed as a groove in the support 37, which guide track preferably includes an interior link roller support surface 92 at either side of the groove (see FIGURES 9 and 10) to receive the link rollers 52 which project below the lower end edge of each cup holder 40 as shown in the drawings. The track elements at the lower ends of the cup holders further comprise outer track guides 93 attached respectively to support 37 at either side thereof at the outer side of the track 51. These outer track guides project a short distance over the track 51, as indicated at 94, to insure retention of the link rollers 52 within the track 51, as will be understood by reference particularly to FIGURE 9. The outer track guides 93 are attached to support 37 as by screws 95. Further included in the track elements at the lower ends of the cup holders 40 are the front end cup holder guide 96 and the rear end cup holder guide 97 which, in the preferred embodiment, are in the form of heavy U-shaped brackets attached, as by bolts 98, to the support 37 through the appropriate bolt holes therethrough (not numbered). The front and rear cup holder guides 96, 97 are each located at an elevation above support 37 such as will provide tangential engagement therewith by the inner peripheries of the cup holders during their traverse of the front and rearward ends of the apparatus, as particularly indicated in FIGURES 6 and 7. To more clearly illustrate the arrangement, the front end cup holder guide 96 is indicated in FIGURE 9. It will be noted that the track surfaces 96a and 97a of the cup holder guides 96, 97 respectively are shaped to conform with the locus of the tangent points of engagement therewith by the cup holders 40 during their movement past the front and rearward ends of the apparatus. Additional track elements at the rearward end of the base or support 37 are the inner track plate 99 and the outer track plate 100 which will be more clearly understood by reference to FIGURES 6 and 7. These plates have spacer brackets 103, 104 respectively, which space the plates upwardly from support 37 to which they are attached, as by screws 101 and 102 respectively, which pass through the brackets 103, 104 as seen particularly from FIGURE 6. The inner and outer track plates 99 and 100 are laterally spaced apart in conforming configuration, as seen in FIGURE 7, to provide a track in which the linkage means 85 are guided at the rearward end of the apparatus, the width of the spacing approximating the distance between the inner vertical edge of the track 51 and the edge of track guide 93 where the latter projects as at 94 into the width of the track 51.

At the upper ends 40a of the cup holders, and extending longitudinally substantially the straight length of the path of cup holder movement, is a top track guide 105 for guiding the cup holders during the rectilinear portion of their movement. The top track guide 105 is supported by two support rods 106 to which the former is attached, as by nuts 107. The lower ends of the support rods 106 are attached to the support 37, as by nuts 108.

It will be noted that the hinge means 46, which mounts the two magazine top end covers 45, is attached to the top track guide 105, as by welding.

Thus, it is seen that the cup holder magazine 39 is vertically mounted for rotatable movement with respect to the base or support 37 for the purpose of indexing each of the cup holders 40 sequentially into its cup dispensing position at the front end of the apparatus, which position is that of alignment of the cup holder with the opening 50 through the support 37 and with the throat of the cup dispensing head 38, the latter to be more fully described.

The upwardly spaced relation of the top surfaces 93a of the outer track guides 93 and the corresponding upwardly spaced relation of the inner and outer track plates 99, 100 at the rearward end of the apparatus together provide a platform for support of the stacks of cups S which reside in the cup holders 40, the lower cup 34 in each stack sliding along the continuous platform thus provided. The spacing also provides clearance for engagement of the linkage means 85 by the rotatable star wheel 110 at the center of support 37 and which forms a part of the magazine indexing drive means, and by the locking gear 111 and cup gate 112 which are pivotally mounted, as shown, on support 37. Description of the details and operation of star wheel 110, locking lever 111 and cup gate 112 will be deferred until the construction and operation of the dispensing head 38 has been explained.

Proceeding now with the description of the construction of the dispensing head 38, reference will be made to FIGURES 8, 9 and 11 to 17, inclusive. FIGURE 11 is a top plan view of the dispensing head as shown in front elevation on FIGURE 9. The bottom plan view is shown in FIGURE 8.

Referring first to FIGURE 9, the dispensing head 38 has an upper housing member 115 and a lower housing member 116 which are preferably hollow castings having suitable vertical and matching interior rib portions 117, 118 (see FIGURES 13 and 14), the rib portions respectively being provided with aligned bores 119, 120 to receive the attachment bolts 121 which slidably engage the bores 119 in the upper housing member 115 and which are in threaded engagement, as at 122, with the bores 120 of the lower housing member 116, thereby attaching the lower and upper housing members together. The upper and lower housing members 115, 116 are annularly shaped to provide a cup dispensing passage 123 through which cups will be dispensed in vertical direction through dispensing head 38. This vertical passage through the dispensing head is more often referred to as the throat portion of the dispensing head.

In annularly and alternately spaced apart relation about the passage 123 there are three vertically arranged cup support elements 124 and three cup stripper elements 125. As will be more fully understood, these elements provide three points of support at all phases of dispenser operation for the stack of cups S which are aligned for passage through the throat portion of the dispensing head, thereby insuring against misalignment and consequent jamming of the stack as the cups enter and pass through the dispenser head. The cup support elements 124 are mounted for full axial rotatable movement on pivot brackets 126 which are, in turn, pivotally mounted between the upper and lower housing members 115, 116. Similarly, the cup stripper elements 125 are mounted for full axial rotatable movement on pivot brackets 127 which are also mounted for pivotal movement between the housing members. It will be noted that the pivot brackets 126 and 127 are identical, excepting for inclusion of the cam follower projection 129 on each of the stripper element pivot brackets 127, which cam follower projection engages a cam formed on the respective stripper elements, as will be later described. This difference is more clearly shown in FIGURE 15 which illustrates in sectional elevation the construction of pivot brackets 126 and 127. Thus, it will be understood that all six of the pivot brackets may be identically made, as by casting, and that each will have a horizontally projecting boss 129a in which the cam follower projection pin 129 is inserted only in those three pivot brackets which will be used in association with the cup stripper elements 125.

FIGURE 15 also shows the means whereby the pivot brackets 126 and 127 are mounted between the housing members 115, 116. First, it should be noted that a horizontally disposed gear 130 is mounted for rotatable movement on a shaft 131 of each stripper element pivot bracket 127 and that a similar gear 132 is similarly mounted on the shaft 133 of each support element pivot bracket 126. The shafts 131 and 133 also provide the axis of pivotal movement of the pivot brackets 127, 126 respectively and, accordingly, are press-fit within the respective vertical bosses 134, 135 of pivot brackets 127, 126 and project downwardly below the bottom of the pivot brackets for pivotal engagement within the bearing apertures 136, 137 in the lower housing member 116. The gears 130 and 132 are retained on the shafts 131 and 133 by the respective cotter pins 138, 139. In vertical alignment with the location of shafts 131, 133 and at the tops of the respective pivot brackets 127, 126 are dowel-like projections 140, 141 which pivotally engage the respective bearing apertures 142, 143 in upper housing member 115, as shown, thus providing support at the opposite ends of the respective axes of pivotal movement of the pivot brackets 127, 126. Thus, each of the pivot brackets 126, 127 is vertically arranged and mounted for vertical pivotal movement in a fixed position with respect to the attached upper and lower housing members 115, 116.

As seen in the right hand portion of FIGURE 15, each of the cup support elements 124 is vertically mounted for fully rotatable movement on a second vertical shaft 144 of their respective pivot brackets 126. Each shaft 144 is press-fit within the apertures 145 and 146 in the top and bottom portions of the pivot bracket 126. At the top of the pivot bracket, the shaft 144 projects upwardly beyond the top of the pivot bracket and through a slotted aperture 147 (see FIGURE 13) in the upper housing member 115 for pivotal connection of one of the cup guide segments 148 (also see FIGURE 18) as by a cotter pin 149a and an elongated screw 149 which is threaded into an axial bore 150 of the shaft 144, as seen from the sectional view of FIGURE 15. At the lower end of the shaft 144 there is a cam follower projection 151 which may take the form of a bolt threaded into another axial bore 152 of the shaft, as shown, the cam follower projection 151 extending below the bottom of pivot bracket 126 and through a slotted aperture 153 (see FIGURE 13) in the lower housing member 116 for slidable connection within a cam track 154 of an annularly movable iris plate 155 (see FIGURE 8) at the underside of lower housing member 116. The iris plate 155 being not otherwise supported, the cotter pins 156 of the cam follower projections 151 retain the engagement between the iris plate and the cam follower projections of all of the pivot brackets. The iris plate 155 resides within the annular recess 157 of the lower housing 116 provided for the purpose.

Referring now to the stripper elements 125, these are similarly mounted for fully rotatable movement on the second vertical shafts 158 of their respective pivot brackets 127, each shaft 158 at the lower end thereof being similarly extended below its respective pivot bracket and connected in cam follower engagement with the iris plate 155, its cam follower projection 159 also being in the form of a bolt threadedly engaging the axial bore 160 of the shaft 158 and passing through another slot aperture 163 (see FIGURE 13) in the lower housing 116 to engage another of the cam slots 154 of the iris plate 155, the cotter pin 161 being provided to retain the engagement therewith of iris plate 155. The shaft 158 is press-fit at its lower end into the support aperture 162, which is provided through the bottom of pivot bracket 127, the connection being identical with that of the shafts 144 in the pivot brackets 126. However, at the upper end of the shaft which is press-fit into the aperture 164 in the top portion of the pivot bracket 127, the shaft 158 does not project above the pivot bracket, as do the shafts 144 of the support element pivot brackets, although either group of shafts 144 or 158 could project upwardly through slot openings such as 147 in the upper housing member 115 for attachment of the cup guide segments 148, whichever group of shafts seems preferably utilized for the purpose.

Referring now to FIGURES 13 and 14, it is seen that at the outer periphery of the upper housing member 115 where it joins with the periphery of the lower housing member 116, space 165 is provided wherein is situated a ring gear 166. The ring gear 166 is rotatable in annular direction concentric with the throat passage 123 of the dispensing head 38 within the ring gear space 165. Referring to the left hand portion of FIGURE 14, it is seen that the elevation of the ring gear 166 is such as to provide meshing engagement of its interior peripheral teeth 166a with the teeth 130a and 132a of the gears 130, 132 which are mounted respectively on the pivot brackets 127, 126. The ring gear 166 also has exterior peripheral teeth 166b for engagement by the spur gear portion 169b of the miter gear 62 for driving the dispensing head 38, as most clearly illustrated in FIGURE 21.

Referring again to FIGURE 15, it is seen that each of the cup support elements 124 have an attached spur gear 167 which may be integrally formed as a portion of the element itself, as shown. Similarly, each of the cup stripper elements 125 has an attached spur gear 168 which also might be integrally formed with the element. The gears 167 and 168 are therefore freely rotatable, as are the support and stripper elements to which they are attached. The respective gear teeth 167a and 168a of these gears are in meshing engagement with the teeth 132a and 130a respectively of the gears 132, 130.

The arrangement and construction of the miter gear 62 for driving the dispensing head 38 will be understood from FIGURES 11, 12 and 21. The miter gear 62 consists of a horizontally disposed bevel gear element 169 which has bevel teeth elements 169a, and the integrally formed vertical spur gear teeth 169b, which engage ring gear 166, as previously described. The horizontally disposed bevel gear element 169 is mounted for freely rotatable movement on a shaft 170 which is press-fit into the miter gear housing 171, the gear 169 being retained on the shaft 170 as by a cotter pin 170a. Meshing with the bevel gear teeth 169a are the bevel gear teeth 172a of the vertically disposed bevel gear 172 which is attached, as by a clamping screw 173, to the miter gear shaft 62a. The miter gear shaft 62a extends through a bearing aperture 174 of miter gear housing 171 so as to project therefrom to engage the connection sleeve 60 of the dispensing head drive shaft 58, as previously described. The miter gear shaft 62a has a flange portion 175 which prevents the shaft from sliding in axial direction out of the bearing aperture 174. The miter gear housing 171 is attached, as by screws 176, to a projection of the lower housing member 116, as more clearly shown in FIGURES 11 and 21.

Thus, it will now be understood that by reason of the freely rotatable mounting of the cup support elements 124 and cup stripper elements 125 and their respective meshing engagements with the freely rotatable gears 132, 130 which are mounted in the pivot brackets 126, 127 and which, in turn, mesh with the ring gear 166, rotation of the ring gear 166 will cause the cup support elements and cup stripper elements to rotate. In normal operation of the preferred embodiment as shown in the drawings, upon energizing the dispensing head drive motor 55, the drive motor shaft 58 will cause clockwise rotation of the miter gear shaft 62a and its attached vertical bevel gear 172, as indicated in FIGURE 12. Referring now to FIGURE 11, the clockwise rotation of the vertical bevel gear 172 will cause counterclockwise rotation of the horizontally disposed bevel gear 169 and its integral spur gear 62b. The ring gear 166 will be thus rotated in clockwise direction. Now referring to FIGURE 13, clockwise rotation of ring gear 166 will cause clockwise rotation of the gears 130, 132 so that the cup support elements 124 and stripper elements 125, which mesh with the gears 132, 130 by their attached spur gears 167, 168, will in turn be caused to rotate in counterclockwise direction.

The dispensing head drive motor 55 will be energized in response to the closing of an on-off switch (not shown) which may be coin actuated, as is understood in the art. Energizing of the dispensing head drive motor will be for a limited time duration corresponding to the cycle of operation of dispensing head 38 which is necessary to cause one drinking cup to be dispensed from the apparatus, as will now be described.

Referring to FIGURES 15 through 17 which illustrate the sequence of movements of the cup support elements 124 and stripper elements 125 in dispensing a drinking cup 34 from a stack thereof within the apparatus, it is seen that the cup stripper elements 125 are shorter in length than the cup support elements 124 and that the integral gears 168 thereof are elongated as compared with gears 167 of the support elements, so that the stripper elements 125 are vertically slidable on their respective shafts 158. Each stripper element 125 has a cam portion 177, formed as a groove in the outer surface of the element, which is engaged by the cam follower projection 129 of the associated pivot bracket 127. It is seen, therefore, that upon rotation of a stripper element 125, the cam and follower arrangement will cause vertical reciprocating movement of the stripper element on its mounting shaft 158.

As seen from the plan view of a cup stripper element as shown at the extreme left hand side of FIGURES 15, 16 and 17, each stripper element 125 has a radially projecting flat flange segment 178 at the upper end thereof, the flat flange segment 178 extending substantially two hundred and ten degrees about the periphery of the stripper element. The flat flange segment 178 is formed as an integral part of the stripper element 125 and, in operation, engages the uppermost edge 35a of the flange 35 on the cup 34 which is to be dispensed, as will be later more fully understood.

Referring now to the right hand side of FIGURES 15 through 17, it is seen that at the top end of each cup support element 124 a flat flange segment 179 extends substantially two hundred and seventy degrees about the periphery of the support element. In axially spaced relation below the flat flange segment 179, the spacing corresponding substantially to the vertical height of a cup flange 35, the cup support element 124 has another flat flange segment 180 projecting therefrom and extending substantially ninety degrees about the periphery of the support element. The flat flange segment 180 is oriented beneath the segment gap 179a in the top flange segment 179.

Proceeding now with the description of the operation of the dispensing head 38 in dispensing one cup 34 from the lower end of a stack S thereof, the initial positions of the cup support elements 124 and cup stripper elements 125 are substantially that shown in FIGURE 16. The cup support elements 124 are each disposed having their lower flat flange segments 180 projecting radially into the throat passage 123 of the dispensing head. When a stack of cups S is dropped into the throat passage 123 the stack segments 180 will engage the underside 35b of the flange 35 of the lowermost cup 34 in the stack. Thus, the entire stack of cups S will be supported at three points about the periphery of the passage 123 by the three cup support elements 124 annularly disposed thereabout. It will be noted that the cup stripper elements 125 are not in engagement with the cups 34, but that their flat flange segments 178 are positioned at a location just prior in the rotative cycle to their engagement with the upper side 35a of the flange 35 of the lowermost cup of the stack.

Upon actuation of the dispensing head motor 55, as by depositing a coin in the vending machine, the motor will operate for a time duration sufficient to rotate the ring gear 166 in clockwise direction that distance which will cause all of the cup support and stripper elements to rotate a full three hundred and sixty degrees, which rotation defines a cup dispensing cycle of operation. From their respective positions as shown in FIGURE 16, the elements 124, 125 next rotate to their positions as shown by FIGURE 17 wherein the upper flat flange segments 179 of the cup support elements 124 have moved into engagement with the underside 35b of the next to the lowermost cup 34 in the stack, and the lower flat flange segments 180 of the support elements 124 have moved out of engagement with the underside 35b of the lowermost cup in the stack, which is that cup about to be dispensed from the apparatus. Simultaneously with the disengagement of the lower flat flange segments 180 from the lowermost cup, the cup stripper elements 125 have rotated sufficiently to cause their radially projecting flat flange segments 178 to engage the uppermost edge 35a of the flange 35 of the lowermost cup. Continued rotative movement of the cup support and stripper elements results in the vertical stripping down of the lowermost cup off from the bottom of the stack, in the manner indicated by FIGURE 15, yet the remaining cups in the stack S continue to be fully supported by the upper flat flange segments 179 of the support elements 124.

The direct drop of the lowermost cup 34 into an upright position thereof to be filled with beverage is caused by the simultaneous engagement during the dispensing motion of all three of the flat flange segments 178 of the cup stripper elements 125 with the uppermost edge 35a of the cup flange 35 and by the simultaneous, vertically downward movement of the stripper elements 125 caused by the cam and follower arrangement 129, 177, as previously described. Continuous engagement of the cup by all of the stripper element flange segments 178 until the cup has been unnested from the stack is therefore assured. When thus pulled out of its nested condition at the bottom of the stack, the cup will drop directly and uprightly into proper position to be filled with beverage.

Continued rotation of the cup support and stripper elements moves them again to their positions as shown by FIGURE 16 whereat the dispensing head motor 55 is automatically deactuated. It is seen in FIGURE 16 that at the end of the dispensing cycle the segment gaps 179a in the uppermost flat flange segments 179 of the cup support elements 124 are simultaneously again brought into tangential relationship with the stack of cups S and that the remaining cups in the stack are no longer supported by the flange segments 179 so that the entire stack drops vertically past the segments 179 a distance corresponding to the height of a cup flange 35, the stack S again to be supported by the lowermost flat flange segment 180 of the support elements 124. It becomes apparent that indexing of the stack S downwardly to bring another cup 34 into a position thereof whereat it is ready to be dispensed is accomplished by the cup support elements 124. It will be noted that at all times during the cup dispensing cycle the stack of cups S is supported at three points about the flange 35 of the lowermost cup in the stack. The three points are either those provided by engagement of the lower projecting flat flange segments 180 when the apparatus is at rest and as seen in FIGURE 16, or by the three points of engagement of the upper flat flange segments 179 of the cup support elements at times during cup dispensing movement of the elements.

For an understanding of the actuation and operation of the cup dispensing head motor 55, reference is made to FIGURES 6, 8, 10, 18 and 19. Referring first to FIGURE 19, a primer microswitch 182 is mounted at the underside of the support 37 immediately behind the dispensing head 38. The primer microswitch 182 is in the main power circuit (not shown) of the dispensing head motor 55 and is a normally-open switch, its integral actuating element 182a being held by gravity in its downward or switch-open position. Attached for pivotal movement to a projection 148c of one of the cup guide segments 148 is a primer switch actuating lever 183 which is weighted, as by a bended portion thereof at one of its ends 183a, so as to normally cause the lever to be out of engagement with the primer switch actuating element 182a as shown on the drawing. When lever 183 is in this position, the apparatus cannot be actuated.

At its opposite end 183b, the primer switch actuating lever 183 has a bent portion which normally projects into the cup zone at throat passage 123 for engagement by the stack of cups S when positioned therewithin. A positioned stack of cups S will depress the lever to its position as shown in FIGURE 18 and, in turn, activate the primer microswitch 182, thus priming the dispensing head drive motor circuit for actuation. Actuation of the on-off switch of the apparatus will then cause the dispensing head drive motor to be energized in a manner so as to cause a single cup dispensing cycle of operation of the dispensing head 38, as previously described. Control of the time cycle of operation of the dispensing head motor 55 will be generally understood by a reference to FIGURES 6, 8 and 10, from which it will be observed that the dispensing head drive shaft 53 is extended out of the gear box 56 towards the rear of the apparatus to also serve as a cam shaft 184. The cam shaft 184 is supported at its rearward end by a bracket 185 which is attached, as by a bolt 186, to depend from the support 37. Cams, such as are indicated at 187, 188, are mounted on the cam shaft 184 to be engaged by the rollers 189, 190 respectively of the microswitches 191, 192 which are mounted on the microswitch support rods 193. The microswitch support rods 193 are attached extending between the support bracket 185 at the one end thereof and a second support bracket 194, also attached to and depending from the support 37, at the opposite ends thereof.

The diametrical size proportioning between the cam elements 187, 188, and the cup support and stripper elements 124, 125 is such that one cycle of cup dispensing operation of the cup support and stripper elements is coincident with one revolution of the cam support shaft 184 and therefore with one revolution of the cams 187, 188. The high and low dwell portions of the microswitch cams are so oriented, and the electric circuit including the microswitches and a conventional coin-actuated on-off switch (not shown) is so arranged that continuous operation of the dispensing head 38 through one cup dispensing cycle is assured and, further, that the dispensing head drive motor 55 will be deactivated promptly at the end of such cycle.

A third microswitch 195 mounted on the support rods 193 controls the actuation of the cup holder magazine indexing motor 196 by engagement of its roller 197 with the cam 198, the latter also being mounted on the cam shaft 184. The magazine indexing motor 196 has an associated reduction gear box 199 and causes rotative movement of the star wheel 110 to index another of the cup holders 40 into its cup dispensing position in alignment with the throat passage 123 of dispensing head 38 upon depletion to a predetermined amount of the supply of cups in the preceding cup holder, as will be described more fully hereinafter.

Returning to the description of features incorporated in the dispensing head 38, the extents of projection of the cup support and stripper elements 124, 125 into the throat passage 123, in radial direction with respect thereto, are adjustable to provide accommodation for cups of different diameters which may be dispensed by the apparatus. Such adjustment to the effective throat size of the dispensing head 38 is effected by pivoting to an equal extent about their respective axes of pivotal movement, all of the pivot brackets 126, 127 upon which the cup support and stripper elements are mounted. The pivoting of the pivot brackets for the purpose is brought about by the cam and follower type slidable connections with the iris plate 155 of the shafts 144 and 153, on which the cup support and stripper elements are mounted within their respective pivot brackets, as will now be described. Referring first to FIGURE 8, it will be remembered that the shafts 144 of the cup support elements 124 have cam follower projection portions 151 which respectively engage each of three arcuately and eccentrically disposed cam slots 154 of the iris plate 155. Similarly, each of the shafts 158 of the cup stripper elements 125 have cam follower projection portions 159 which slidably engage the remaining three cam slots 154 of the iris plate, the latter cam slots in alternate disposition with respect to those first mentioned. As shown in FIGURE 8, the shafts 144 and 158 have been positioned at those ends of the slots 154 which are radially farthest from the center of throat passage 123 so that the apparatus, as shown, is arranged to accommodate cups having a diameter which is the maximum of that which the apparatus is capable of handling. As compared with the annular moveability of the iris plate 155, the annular locations of the shafts 144 and 158 with respect to the throat passage 123 is relatively fixed, and it will therefore be apparent that, by reasons of the slidable connections, if the iris plate 155 is annularly pivoted with respect to throat passage 123 in counterclockwise direction as indicated in FIGURE 8, the shafts 144 and 158 will move in radially inward direction with respect to the throat passage 123 by following the progressively inward displaced paths provided by the slots 154. Referring to FIGURE 13 (which by reason of the view taken indicates the iris plate as moving in clockwise direction), it is seen that as shafts 144, 158 are moved radially inward with respect to the throat passage 123, all of the pivot brackets 126, 127 are pivoting about their respective axes of pivotal movement, as provided by the shafts 133, 131 and dowel-like projections 141, 140 which are pivotable within bearing apertures 137, 136, 143, 142 of lower and upper housing members 116, 115.

The gears 132, 130 which are fully rotatable on the shafts 133 and 131, and being meshed with the now stationary ring gear 166, will not rotate in response to pivotal movement of the pivot brackets, but rather the shafts 133 and 131 will pivot with respect to these gears. However, the gears 167 and 168 which are integral with the cup support and stripper elements 124 and 125 and are meshed with gears 132, 130 will roll about the respective gears 132, 130 a slight amount according to the arcuate distance of pivotal movement of the pivot brackets 126, 127. This rotation might cause the cup support and stripper elements 124, 125 to move out of their intended initial positions for cup dispensing operation as shown in FIGURE 16, except that the ninety degree arcuate extent of the segment gaps 179a of the cup support flat flange segments 179, as well as the one hundred fifty degree arcuate extent of the segment gaps provided in the flat flange segments 178, are sufficiently great to accommodate such comparatively small rotative adjustment of the cup support and stripper elements 124 and 125 so that they will not be rotated to an extent beyond those positions thereof whereat they will be effective as intended within the full range of pivotal movement of the pivot brackets 126 and 127.

Annular rotative movement of the iris plate 155 is effected by the worm gear 200 whose teeth 200a engage the outer peripheral teeth 155a of the iris plate, the worm gear 200 being mounted for rotatable movement between bearings 166a, 166b which project from lower housing member 116. The worm gear 200 has a knurled finger knob 201, as shown, for manual manipulation thereof. Thus, to adjust the effective diameter of the throat passage 123 to accommodate cups having different sizes, it is only necessary to twist the finger knob 201 in one direction or the other accordingly as the extent of radial projection of the cup support and stripper elements 124 and 125 within the passage 123 is to be increased or decreased to accommodate cups of smaller or larger size respectively.

It will be noted that the iris plate 155 has an attached indicator 202 to indicate the annular disposition of the iris plate and consequently the extent to which the cup support and stripper elements project radially into the throat passage 123. The indicator 202 is attached, as by screws 203, at the bottom of the iris plate (FIGURE 8) and projects radially outward therefrom, having an upwardly bent pointer portion 202a which points to indicia 204a on the indicator scale plate 204, which is attached to lower housing member 116, to indicate the cup size for which the dispensing head 38 is adjusted to receive. It is noted that although the actual pivoting of the pivot brackets 126, 127 causes non-linear movement in radial direction of the cup support and stripper elements with respect to the throat passage 123, the indicia 204a shows the extent of adjustment of these elements according to a linear scale.

Referring now to FIGURES 9, 11 and 18, it is seen that a cup guide, generally indicated by reference numeral 205 and comprising the three cup guide segments 148, is mounted on the cup dispensing head 38 so as to be disposed between the throat passage 123 of the dispensing head 38 and the apparatus support 37 below the opening 50 therein. Each of the cup guide segments 148 is pivotally connected to one of the upward extensions of cup support pivot bracket shafts 144, the connections being made through the bearing apertures 206 formed in the respective exterior flange portions 207 of the cup guide segments 148 (see FIGURE 18). To retain the parts in engagement, a cotter pin 149a is provided at the top end of each shaft extension, as shown. Thus, it will be understood that when adjustment to the extents of radial projection of the cup support elements into the passage 123 is made, corresponding adjustment will be made to the extent of projection in radial direction of each of the cup guide segments 148 into the cup zone above the throat passage 123. Such appropriate adjustment to the diameter of cup guide 205 assures that the cup guide will at all times effectively serve its purpose to guide a stack of cups S in its drop from a cup holder 40, which has been moved into alignment with the throat 123, into the throat passage 123 of the dispensing head 38. All sizes of cups within the range of capacity of the apparatus will therefore be properly handled.

Referring particularly to FIGURE 11, it is seen that the pivot bracket shafts 144 pivotally engage the respective cup guide segments 148 at locations approximately one-third the way along the segment length of the exterior flange portions 207 thereof, and that the flanges 207 of all of the cup guide segments 148 are connected together in a manner to promote the pivoting thereof to insure substantially concentric disposition of the cup guide 205 with respect to the throat passage 123 regardless of the extent to which adjustment of the aforesaid radial projection thereof has been made. In effect, compensation is provided for the small amount of eccentricity of the cup guide segments 148 which would occur due to the arcuate paths of movement of the shafts 144 to which they are attached, during a throat size adjustment. The flange portions 207 at the respective ends 207a thereof extend into overlapped engagement with the respective other ends 207b thereof, as shown in FIGURE 11. At the end 207b, which is the end nearest the bearing aperture 206 of any cup guide segment 148, there is a vertically projecting pin 209 which serves as a follower in the slot 210 formed in the end 207a of the adjacent overlapped cup guide segment 148. The slots 210 are eccentrically disposed with respect to the passage 123, as shown in FIGURE 11, appropriately to promote such compensating pivotal movement of the respective cup guide segments 148 as they are moved toward or away from the center of the passage 123.

It will also be noticed that the cup guide 205 has a flared upper periphery, formed by flared portions 148a of the segments 148, so as to prevent any possibility that a stack of cups in dropping into the throat passage 123 could jam by engaging the upper end of the cup guide 205. The cup guide segments also have vertical guide extensions 148b (see FIGURES 11 and 13) to guide the passage of a cup 34 as it drops through the dispensing throat of the apparatus upon being dispensed.

To further assure that a stack of cups S will drop properly into the dispensing throat from that cup holder 40 which has been indexed into its cup dispensing position in alignment therewith, and as previously mentioned, a cup gate 112 is pivotally mounted on the support 37, as by a pivot pin 213, the cup gate 112 being spring biased, as by spring 214, toward the support opening 50, as shown in FIGURE 7. The cup gate will operate coincidentally with cup holder magazine indexing movement, as will now be described.

The cup dispensing apparatus 32 is normally in condition as shown in FIGURE 7 with one of the cup holders 40, at the front end 37a of the apparatus, in cup dispensing alignment with the cup dispensing head 38. Referring now to FIGURES 18 and 19, a magazine indexing microswitch 215 is attached to support 37 immediately behind the support opening 50 so that its actuating lever 216 will normally be pivotally biased, by the upward biased projection of the switch actuating element 217, so as to project into the zone under the opening 50 through which the stack of cups S will pass. Thus, the normally position of the microswitch 215 is that of switch-closed position, the actuating lever 216 extending into the cup zone. When there are no cups 34 within the dispensing head 38, or when a stack of cups S therein has been depleted to about a dozen or so remaining, as indicated by dotted lines in FIGURE 19, the cup holder magazine indexing motor 196 will be energized, upon actuation of the apparatus, to cause the magazine to rotate so as to bring another cup holder 40 into cup dispensing alignment with the dispensing head 38.

Such indexing movement is imparted by engagement of the star wheel 110 with the sleeves 90 of the linkage means 85 at the lower ends of the cup holders. As seen in FIGURE 7, the star wheel 110 has four radially extending arms having slots 218—221 respectively to provide means for slidably engaging the sleeves 90 which are rotatable to eliminate friction in the engagement. The arrangement is such that the slots 218—221 will sequentially engage successive linkage means 85 at opposite sides of the apparatus, the action being understood from the drawings by a comparison of FIGURES 7 and 20. The star wheel 110 is attached to the vertically arranged indexing motor drive shaft 222, as by attachment screw 223, the indexing motor shaft 222 projecting from the gear box 199.

Upon actuation of the apparatus by closing the main off-on switch (not shown) as for dispensing an individual cup, the microswitch 215 when in switch-closed position as shown in FIGURE 19 retains in energizable condition a circuit which causes actuation of the solenoid 224 which is mounted at the underside of the support 37. Actuation of solenoid 224 causes retraction of its drive pin 228 to pivot the locking lever 111 in clockwise direction as seen in FIGURES 7 and 20, to disengage the locking detent 111a at the front end thereof from the sleeve 90 at the side of the cup holder 40 towards its direction of forward movement, the referred to cup holder 40 being that which is, at the time, in its cup dispensing position. The locking lever 111 pivots about pivot pin 225 which is suitably attached to the support 37, and is spring biased, as by spring 226, in counterclockwise direction normally into engagement with the referred to sleeve 90. The solenoid drive pin 228 is connected to the locking lever 111 at a location along its length at the opposite side of the pivot location 225 by a universal joint 227 which permits compensating pivotal movement at the connection necessitated by the arcuate movement of the locking lever 111 with relation to the linear movement of the solenoid drive pin 228. Thus, the cup holder magazine 39 has been unlocked and is ready to be rotatably indexed to bring the cup holder 40 next in sequence into cup dispensing position to discharge the stack of cups S therein into the throat passage 123 of the cup dispensing head. At such time, the locking lever 111 is in position as shown in FIGURE 20.

The end 111b of the locking lever 111, opposite that which has the locking detent 111a formed therein, will upon pivotal movement of the lever engage and thereby actuate the magazine index motor starting microswitch 229 which is attached to the underside of support 37 in appropriate position. It becomes apparent, therefore, that the magazine indexing motor cannot start before the locking lever 111 has been pivoted to its location as shown in FIGURE 20, out of locking engagement with one of the linkage means 85.

Indexing movement of the magazine 39 to bring another cup holder 40 containing another supply of cups into cup dispensing alignment with the cup dispensing head 38 is effected in two stages. The first stage is coincident with dispenser operation to dispense that cup which causes depletion of the remaining stack of cups S within the dispensing throat to the desired extent of a dozen or so. During the first stage of indexing movement the magazine will rotate only part way, thereby only partly moving into cup dispensing position that cup holder 40 which is next in indexing sequence. Shut-off of the indexing motor 196 at the end of the first stage is effected by a microswitch such as microswitch 195 on the microswitch support rods 193, by reason of the action of an associated cam 198 which rotates three hundred sixty degrees during the referred to individual cup dispensing cycle.

As seen by a comparison of FIGURES 7 and 20, the cup gate 112 during this first stage of indexing movement of the cup holder magazine will have moved clockwise in response to the bias of its spring 214 and the movement of the linkage means 85 (at the opposite side of the cup holder which is being indexed away from its cup dispensing position) from its location engaging the arcuate-shaped portion 112b of the cup gate, to engagement with the arcuate-shaped relieved portion 112a at the forward end thereof. As the cup holder leaving the cup dispensing position moves farther away from the cup gate 112, the spring biased cup gate moves farther in clockwise direction out over the support opening 50. Thus, the cup gate 112 effects continued support of the stack of cups S in the next succeeding cup holder 40 as the stack moves off of the support therefor provided by platform 93a of outer track guide 93 and until that stack of cups is in suitable position over the support opening 50 ready to be dropped into the throat passage 123 of the dispensing head. Such is substantially the position of cup gate 112 at the end of the first stage of magazine indexing operation.

The second stage of the indexing movement of the cup holder magazine 39 begins coincidentally with actuation of the cup dispensing head 38 to dispense a second cup from the depleted stack of cups which remains therewithin. It is seen from FIGURE 19 that the index motor microswitch lever 216 is still in outwardly pivoted position since an additional supply of cups, which would depress the lever, has not yet been dropped into the dispensing head 38. Consequently, upon activation of the apparatus to dispense the referred to next cup, the solenoid 224 will again be energized to again cause pivoting of the locking lever 111 to its position as shown in FIGURE 20. In operation sequence as described, the magazine index motor 196 will again be activated so as to further rotate star wheel 110 through the balance of its ninety degree complete cycle of indexing movement. During this second stage of movement, the arcuate surface 112b of cup gate 112 will become engaged by the linkage means 85 at the trailing side of the cup holder then being indexed into the cup dispensing position, which engagement causes the cup gate 112 to pivot in counterclockwise direction, against the bias of its spring 214, and thereby removes the support provided by the cup gate for the stack of cups S contained in the cup holder which is then being moved into cup dispensing position. Towards the end of this second stage of movement the stack of cups S will drop directly into the throat passage 123 of dispensing head 38 to nest with the few cups remaining therein, and the cup gate 112 will again have attained its normal position as shown in FIGURE 7.

As the cups drop into the dispensing head, they will strike the microswitch lever 216 and cause the same to pivot so as to open the indexing motor circuit which has been closed by the microswitch 215. Thus, it is seen that so long as a supply of cups sufficient to engage the microswitch lever 216 remains in cup dispensing alignment in dispensing head 38, no indexing movement of the cup holder magazine 39 can occur. Moreover, indexing movement of the cup holder magazine is initiated at a time when a limited supply of cups remains in the dispensing throat so as to prevent discontinuity in the individual cup dispensing operations in the event that, through inadvertence, the cup holder next in indexing sequence is empty of cups. The indexing cycle will commence with each cup dispensing activation of the machine until a cup holder which does contain a stack of cups arrives in the cup dispensing position.

It should be noted that additional cams, such as 220 (FIGURE 6), might be mounted on the cam shaft 184 for use in actuating valves and the like of the vending machine which would cause the dispensing of beverages, or other associated operations in timed sequence with the described cup dispensing actuation of the present apparatus.

Thus has been described a preferred embodiment of the article dispensing apparatus which achieves all of the objects of the invention.

What is claimed is:

1. In apparatus for dispensing flanged articles one at a time from a nested stack thereof, first axially rotatable means of generally cylindrical shape, said first axially rotatable means normally rotatable in only one direction and adapted to support the nested stack of articles and upon one full revolution thereof to cyclically index the end article in the stack into a position thereof whereat it is ready to be dispensed, second axially rotatable means of generally cylindrical shape, said second axially rotatable means normally rotatable in only one direction and having a portion adapted to engage, upon one full revolution of said second axially rotatable means, the flange of said end article when in its said position to dispense the same from the apparatus, at least said portion of the second axially rotatable means mounted for reciprocating movement, in the direction of the axis of rotation of said second axially rotatable means, between a first position of said portion to so engage said flange of the end article and a second position of said portion determinative that said end article has been unnested from said stack of articles, means normally rotatable in only one direction and adapted to rotate said first and second axially rotatable means, and cam and follower means of said second axially rotatable means adapted to impart said reciprocating movement responsive to said rotation thereof and in cyclically coordinated relation with said indexing by the first axially rotatable means to remove said articles one at a time from said end of the stack thereof.

2. In apparatus for dispensing articles one at a time from a nested stack thereof, frame means providing an annular passage for the article being dispensed, a plurality of generally cylindrical and axially rotatable article support elements, a plurality of generally cylindrical and axially rotatable article stripper elements, a separate shaft mounting each of said article support and article stripper elements, all of said shafts mounted in spaced relation with respect to each other about and having their respective axes of rotation parallel to said passage, each of said elements projecting into said passage in radial direction with respect thereto, each of said article stripper elements further mounted for reciprocating movement in the direction of its axis of rotation, and means to adjust the respective extents of radial projection of all of said elements into said passage.

3. In apparatus for dispensing articles one at a time from a nested stack thereof, the structure according to claim 2, wherein said means to adjust the extent of radial projection of all of said elements into said passage comprises an iris head portion of said frame means, each of said elements having a shaft coincident with its axis of rotation, and all of said elements movably connected at their respective shafts to said iris head portion in cam and follower relationship responsive to annular relative movement, with respect to said passage, between said iris head portion and said shafts, whereby said shafts move with respect to said frame means in radial direction with respect to said passage.

4. In apparatus for dispensing articles one at a time from a nested stack thereof, the structure according to claim 3, wherein said iris head portion comprises an annular plate mounted for concentric pivotal movement with respect to said passage, said element shafts mounted in relatively fixed annular relationship with respect to said passage.

5. In apparatus for dispensing articles one at a time from a nested stack thereof, the structure according to claim 4, and further including indicator means attached to said iris head portion for indicating the corresponding extent of said radial projection of all of said elements into said passage in response to said movement of the iris head portion.

6. In apparatus for dispensing articles one at a time from a nested stack thereof, frame means providing an annular passage for the article being dispensed, a plurality of axially rotatable article support elements, a plurality of axially rotatable article stripper elements, all of said elements mounted on said frame means in spaced apart relation about and having their respective axes of rotation parallel to said passage, each of said elements projecting into said passage in radial direction with respect thereto, each of said article stripper elements further mounted for reciprocating movement in the direction of its axis of rotation, means to adjust the respective extents of radial projection of all of said elements into said passage, and guide means mounted on said frame means in annularly disposed relation with respect to said passage, said guide means adjustable in radial direction and connected to at least some of said elements, whereby said means to adjust the respective extents of radial projection of all of said elements also adjusts said guide means in corresponding radial direction.

7. In apparatus for dispensing articles one at a time from a nested stack thereof, means according to claim 6, wherein each of said elements has a shaft coincident with its axis of rotation, and said guide means comprises a plurality of annular segments corresponding to a plurality of said element shafts, each said annular segment pivotally connected to its respective element shaft, and means linking together said annular segments for slidable movement relative to each other.

8. In apparatus for dispensing articles one at a time from a nested stack thereof, frame means providing an annular passage for the article being dispensed and including upper and lower housing members, a plurality of annularly spaced apart and vertically arranged pivot brackets surrounding said passage and mounted for vertical pivotal movement between said upper and lower housing members, a first vertical shaft of each said pivot bracket aligned with its axis of pivotal movement, a ring gear concentrically disposed with respect to said passage and mounted substantially between said housing members for rotatable movement, a gear mounted for rotatable movement on said first vertical shaft of each pivot bracket and meshing with said ring gear, a second vertical shaft of each said pivot bracket spaced from said first shaft thereof, an article dispensing element having an attached gear mounted for rotatable movement on said second vertical shaft of each pivot bracket, each said dispensing element adapted to project into said passage in radial direction with respect thereto, said dispensing element gears meshing respectively with said gears on said first vertical shafts, whereby rotation of said ring gear imparts article dispensing action to said dispensing elements, and means for pivoting said pivot brackets about their said respective first vertical shafts to adjust the extent of radial projection of all of said elements into said passage.

9. In apparatus for dispensing articles one at a time from a nested stack thereof, means according to claim 8, wherein said means for pivoting said pivot brackets comprises cam means mounted on one of said housing members for annular movement with respect to said passage, and an extension of said second vertical shaft of each said pivot bracket engaging said cam means.

10. In apparatus for dispensing articles one at a time from a nested stack thereof, means according to claim 9, wherein said cam means comprises an annular plate concentric with said passage and having a plurality of arcuate and eccentrically disposed cam slot portions, said extensions of said second vertical shafts respectively engaging said cam slot portions.

11. In apparatus for dispensing articles one at a time from a nested stack thereof, frame means providing an annular passage for the article being dispensed and including upper and lower housing members, a ring gear concentrically disposed with respect to said passage and mounted for rotatable movement substantially between said housing members, a plurality of first vertical shafts mounted between said upper and lower housing members in annularly spaced apart relation with respect to each other and about said passage, each of said first vertical shafts having a gear mounted thereon for rotatable movement and meshing with said ring gear, a corresponding plurality of second vertical shafts mounted between said upper and lower housing members in annularly spaced apart relation with respect to each other about said passage, each of said second vertical shafts associated with one of said first vertical shafts and having a gear mounted thereon for rotatable movement and meshing with said gear on said associated first vertical shaft, an article dispensing element attached to each of said gears on said second vertical shafts, whereby rotation of said ring gear in one direction rotates all of said article dispensing elements through 360 degrees of revolution comprising a cycle of singular article dispensing action thereof, and continued rotation of said ring gear in the same direction rotates all of said article dispensing elements repetitively to reproduce said cycle of singular article dispensing action thereof.

12. In apparatus for dispensing articles one at a time from a nested stack thereof, the structure according to claim 11, wherein said ring gear has an inner peripheral toothed portion engaging all of said gears mounted on said plurality of first vertical shafts, and an outer peripheral portion projecting radially outward of said frame and providing means for engaging said ring gear to rotate the same.

13. In apparatus for dispensing articles one at a time from a nested stack thereof, frame means providing an annular passage for the article being dispensed and including upper and lower housing members, first and second pluralities of annularly and alternately spaced apart and vertically arranged pivot brackets about said passage and mounted between said upper and lower housing members for vertical pivotal movement, a first vertical shaft of each said pivot bracket aligned with its axis of pivotal movement, a ring gear concentrically disposed with respect to said passage and mounted substantially between said housing members for rotatable movement, a gear mounted for rotatable movement on said first vertical shaft of each pivot bracket and meshing with said ring gear, a second vertical shaft of each said pivot bracket, an article support element having an attached gear mounted for rotatable movement on the respective second vertical shafts of each of said first plurality of pivot brackets, an article stripper element having an attached gear mounted for rotatable and further for axial reciprocating movement on the respective second vertical shafts of each of said second plurality of pivot brackets, each said article support element and each said stripper element adapted to project into said passage in radial direction with respect thereto, said attached gear of each article support element and of each article stripper element meshing with the said gear on said first vertical shaft of the pivot bracket with which the element is associated, peripherally disposed cam means of each said article stripper element, and cam follower means substantially stationary with respect to said frame means and associated with each of said second plurality of pivot brackets, said cam follower means respectively engaging said cam means of said article stripper elements to impart said reciprocating movement thereto upon rotation thereof in response to rotation of said ring gear, and means for pivoting said pivot brackets to adjust the extent of radial projection of all of said elements into said passage.

14. In apparatus for dispensing articles one at a time from a nested stack thereof, the structure according to claim 13, wherein said cam follower means comprises a fixed and horizontally projecting portion of each of said second plurality of pivot brackets.

15. In apparatus for dispensing articles from nested stacks thereof, means including a plurality of adjacently disposed article holders for supporting and moving in a curvilinear path of generally rectangular shape a corresponding plurality of nested stacks of articles, means including a dispensing head portion for dispensing the articles one at a time from one of said stacks thereof, and means for indexing said article holders along said path successively into a position of each of the same in article dispensing alignment with said dispensing head portion, the last said means comprising individual pivot type linkage means between each said article holder including a shaft portion of said linkage means and rotatable star wheel means adapted to successively engage each said shaft portion of the linkage means.

16. In apparatus for dispensing articles from nested stacks thereof, means including a plurality of adjacently disposed article holders for supporting and moving in a curvilinear path a corresponding plurality of nested stacks of articles, means including a dispensing head portion for dispensing the articles one at a time from one of said stacks thereof, and means for indexing said article holders along said path successively into a position of each of the same in article dispensing alignment with said dispensing head portion, the last said means comprising individual linkage means between each said article holder, a locking lever mounted for pivotal movement and adapted to engage one of said individual linkage means when one article holder is in its said alignment position, means biasing said locking lever towards a position thereof engaging said one individual linkage means, and means operable coincident with initial indexing movement of said holders for initially moving said locking lever out of its said position to thereby disengage said one individual linkage means.

17. In apparatus for dispensing articles one at a time from a nested stack thereof, the structure according to claim 16, wherein said locking lever when in its said position engages that said individual linkage means of said one article holder at the side thereof which is towards its direction of said indexing movement when said one article holder is in its said alignment position.

18. In apparatus for dispensing articles from nested stacks thereof, means including a plurality of adjacently disposed article holders for supporting and moving in a curvilinear path a corresponding plurality of nested stacks of articles, means including a dispensing head portion for dispensing the articles one at a time from one of said stacks thereof, means for indexing said article holders along said path successively into a position of each of the same in article dispensing alignment with said dispensing head portion, and gate means interposed between said article holders and said dispensing head portion, said gate means mounted for movement generally coincident with indexing movement of each article holder from a normal position of said gate means at one side of said alignment position of the article holders first to an actuated position of said gate means, within the zone of alignment of an article holder in said alignment position with said dispensing portion, and thence from said actuated position of the gate means to said normal position thereof upon an article holder having arrived at its said alignment position.

19. In apparatus for dispensing articles from nested stacks thereof, means including a plurality of adjacently disposed article holders for supporting and moving in a curvilinear path a corresponding plurality of nested stacks of articles, means including a dispensing head portion for dispensing the articles one at a time from one of said stacks thereof, means for indexing said article holders along said path successively into a position of each of the same in article dispensing alignment with said dispensing head portion, the last said means comprising individual linkage means between each said article holder, and gate means interposed between said article holders and said dispensing head portion, said gate means mounted for movement generally coincident with indexing movement of each article holder from a normal position of said gate means at one side of said alignment position of the article holder first to an actuated position of said gate means, within the zone of alignment of an article holder in said alignment position with said dispensing portion, and thence from said actuated position of the gate means to said normal position thereof upon an article holder having arrived at its said alignment position, said gate means further mounted for successive engagement by said individual linkage means whereby said indexing movement of an article holder causes said movement of the gate means.

20. In apparatus for dispensing articles from nested stacks thereof, the structure according to claim 18, wherein said gate means comprises a flat plate mounted at an end portion thereof for pivotal movement, and means biasing said flat plate towards said actuated position of the gate means.

21. In apparatus for dispensing articles from nested stacks thereof, the structure according to claim 20, wherein said flat plate has two arcuate cam surfaces for engagement by said linkage means, the first said cam surface disposed toward said end portion with respect to the second said cam surface, one said individual linkage means of that one article holder next to be indexed into its said alignment position and which is at that side of said one article holder towards the direction of its said indexing movement first engaging the first said cam surface when said gate means is in its said normal position, and said one individual linkage means thence engaging the second said cam surface during at least a period of said one article holder indexing movement, and a second individual linkage means of said one article holder and which is at that side thereof opposite said direction of indexing movement engaging the first said cam surface during at least the remaining period of said one article holder indexing movement.

22. In a machine for dispensing a beverage in individual serving cups, the structure according to claim 27, wherein said openable side of the machine is the front side thereof.

23. In a machine for dispensing a beverage in individual serving cups, the structure according to claim 27, wherein said openable side of the machine is the front side thereof, and wherein said track means are further adapted to provide a distance of horizontal movement of the cup dispensing apparatus outward of said confines of the machine and a subsequent distance of movement providing said tilt of the apparatus.

24. In apparatus for dispensing flanged articles one at a time from a nested stack thereof, first axially rotatable means of generally cylindrical shape, said first axially rotatable means normally rotatable in only one direction and adapted to support the nested stack of articles and upon one full revolution thereof to cyclically index the end article in the stack into a position thereof whereat it is ready to be dispensed, second axially rotatable means of generally cylindrical shape, said second axially rotatable means normally rotatable in only one direction and having a portion adapted to engage, upon one full revolution of said second axially rotatable means, the flange of said end article when in its said position to dispense the same from the apparatus, at least said portion of the second axially rotatable means mounted for reciprocating movement, in the direction of the axis of rotation of said second axially rotatable means, between a first position of said portion to so engage said flange of the end article and a second position of said portion determinative that said end article has been unnested from said stack of articles, means adapted to rotate said first and second axially rotatable means, and cam and follower means of said second axially rotatable means adapted to impart said reciprocating movement responsive to said rotation thereof and in cyclically coordinated relation with said indexing by the first axially rotatable means to remove said articles one at a time from said end of the stack thereof, said first axially rotatable means having first and second radially protruding flat flange segments in axially spaced apart relation with respect to each other, said first radially protruding flat flange segment protruding throughout substantially 270 degrees of the circumference at one end of said first axially rotatable means, said second radially protruding flat flange segment protruding throughout substantially the remaining 90 degrees of the circumference near said one end of the first axially rotatable means, and said portion of the second axially rotatable means comprising a protruding flat flange segment protruding throughout substantially 210 degrees of the circumference at one end of the second axially rotatable means which corresponds to said one end of the first axially rotatable means, said second radially protruding flat flange segment of the first axially rotatable means and the remaining 150 degrees of circumference of said second axially rotatable means being initially oriented in direction facing generally towards the longitudinal centerline of said nested stack of articles when positioned in said apparatus.

25. In apparatus for dispensing articles one at a time from a nested stack thereof, frame means providing an annular passage for the article being dispensed, a plurality of axially rotatable article support elements, a plurality of axially rotatable article stripper elements, all of said elements mounted on said frame means in spaced apart relation about and having their respective axes of rotation parallel to said passage, each of said elements projecting into said passage in radial direction with respect thereto, each of said article stripper elements further mounted for reciprocating movement in the direction of its axis of rotation, each of said article support and stripper elements having peripherally disposed gear tooth means extending substantially in alignment with its axis of rotation, drive gear means including a ring gear concentrically disposed with respect to said passage, said drive gear means being mounted for rotatable movement on said frame and in driving engagement with said gear tooth means of all of said article support and stripper elements whereby rotation of said ring gear imparts said rotatable movement to all of said article support and stripper elements, peripherally disposed cam means of each said article stripper element, and cam follower means engaging each said stripper element cam means and mounted in substantially fixed position with respect to said frame means, each of said cam means being adapted to promote said reciprocating movement of its associated article stripper element responsive to said rotatable movement of the latter.

26. In apparatus for dispensing articles one at a time from a nested stack thereof, means according to claim 25, wherein said gear tooth means of each article stripper element is of an elongated spline type formed substantially integral with its associated stripper element, and said drive gear means at least as it engages said gear tooth means of all of said article stripper elements has straight gear teeth meshing with the same whereby, upon said reciprocating movement being imparted to said article stripper elements, said gear tooth means of the stripper elements slide relative to said meshing gear teeth of the gear means.

27. In a machine for dispensing a beverage in individual serving cups, an interior frame portion of said machine, a multistack cup dispensing apparatus including a base portion and a plurality of vertically arranged hollow tubular cup holders mounted on said base portion for containing a corresponding plurality of nested stacks of serving cups, said dispensing apparatus adapted to dispense said cups one at a time for use from the lower ends of said cup holders, each of said cup holders having an open top end for loading the same with cups, and track and follower means between said machine frame portion and said base portion of the cup dispensing apparatus for mounting the latter in a first position thereof normally within the confines of said machine, said machine including an openable side thereof, said track means being attached to said machine frame portion and said follower means comprising rollers attached to said dispensing apparatus base portion and engaging said track means, said track and follower means adapted to permit rolling movement of said cup dispensing apparatus to a second position thereof substantially adjacent said openable side of the machine, and said track means adapted to tilt said cup dispensing apparatus upon said rolling movement thereof towards its said second position to expose all of said cup holder top ends for loading from said openable side of the machine.

References Cited in the file of this patent
UNITED STATES PATENTS

| | | |
|---|---|---|
| 1,096,499 | Flateau | May 12, 1914 |
| 1,680,238 | Baker | Aug. 7, 1928 |
| 2,189,740 | Mills | Feb. 6, 1940 |
| 2,385,267 | Franz | Sept. 18, 1945 |
| 2,542,067 | Waite et al. | Feb. 20, 1951 |
| 2,559,690 | Von Stoeser | July 10, 1951 |
| 2,571,283 | Nicholson | Oct. 16, 1951 |
| 2,730,268 | Moesch | Jan. 10, 1956 |
| 3,032,237 | Erickson | May 1, 1962 |

UNITED STATES PATENT OFFICE
CERTIFICATE OF CORRECTION

Patent No. 3,120,324            February 4, 1964

Stephen W. Amberg et al.

It is hereby certified that error appears in the above numbered patent requiring correction and that the said Letters Patent should read as corrected below.

In the grant, line 1, and in the heading to the printed specification, line 4, for "Stephan W. Amberg", each occurrence, read -- Stephen W. Amberg --; column 22, line 71, after "first" insert -- vertical --.

Signed and sealed this 16th day of June 1964.

(SEAL)
Attest:

ERNEST W. SWIDER
Attesting Officer

EDWARD J. BRENNER
Commissioner of Patents